United States Patent
Bhargava et al.

(10) Patent No.: US 9,652,485 B1
(45) Date of Patent: May 16, 2017

(54) METHOD AND APPARATUS FOR NAMESPACE VERSIONING

(71) Applicant: Evolphin Software, Inc., San Ramon, CA (US)

(72) Inventors: Rahul Bhargava, San Ramon, CA (US); Siddharth Srinivasan, New Delhi (IN)

(73) Assignee: Evolphin Software, Inc., San Ramon, CA (US)

( * ) Notice: Subject to any disclaimer, the term of this patent is extended or adjusted under 35 U.S.C. 154(b) by 253 days.

(21) Appl. No.: 14/505,522

(22) Filed: Oct. 3, 2014

Related U.S. Application Data

(62) Division of application No. 13/161,507, filed on Jun. 16, 2011, now Pat. No. 8,868,506.

(60) Provisional application No. 61/356,025, filed on Jun. 17, 2010.

(51) Int. Cl.
*G06F 17/30* (2006.01)
*G06F 9/46* (2006.01)

(52) U.S. Cl.
CPC ........ *G06F 17/30356* (2013.01); *G06F 9/466* (2013.01)

(58) Field of Classification Search
USPC ....................................................... 707/648
See application file for complete search history.

(56) References Cited

U.S. PATENT DOCUMENTS

| | | | | |
|---|---|---|---|---|
| 5,535,386 | A | * | 7/1996 | Wang .................... G06F 8/71 |
| 7,392,243 | B2 | * | 6/2008 | Brown ............... G06F 17/2211 |
| 2009/0043867 | A1 | * | 2/2009 | Sharp .................. H04L 67/1095 709/218 |
| 2009/0217302 | A1 | * | 8/2009 | Grechanik ............... G06F 8/70 719/320 |

OTHER PUBLICATIONS

Dave Beckett. RDF/XML Syntax Specification (REvised). W3C. Draft. Oct. 10, 2003.*

* cited by examiner

*Primary Examiner* — Hosain Alam
*Assistant Examiner* — Tuan-Khanh Phan
(74) *Attorney, Agent, or Firm* — Laxman Sahasrabuddhe

(57) ABSTRACT

Methods and systems for digital asset management are described. Some embodiments provide methods and systems for: (1) a high-performance database system for storing assets and the associated metadata, (2) computing an inverse delta between two files without generating any intermediate files or deltas, (3) uniquely identifying a digital asset and storing the digital asset's namespace change history in a version control system, (4) inferring dependencies amongst namespace changes, (5) a workflow management tool that is tightly integrated with a version control system, (6) publishing milestones in a project which can consistently maintain the namespace uniqueness invariant, and/or (7) implicitly versioning data and/or files that are associated with certain types of digital assets in a version control system.

18 Claims, 19 Drawing Sheets

```
InvertDelta ( delta_AB, Base, delta_BaseA )
begin
    delta_BA = an empty hunk-list ;
    if delta_AB == NULL then
        // since, A == B.
        return delta_BA ;
    end if if delta_BaseA == NULL i.e. Base == A then
        let delta_BaseA = an empty hunk-list ;
        // i.e. copying all of Base into A with no replacement
    end if let offset_B = 0 ;   // measures offset in file B from A.
    let offset_A = 0 ;   // measures offset in file A from Base.

for every hunk h_B in delta_AB in order starting from front
    do
        // discard all hunks/portions of hunks of delta_BaseA
which lie before the h_B.start in A.
        offset_A = Discard( h_B.start, delta_BaseA, offset_A ) ;

let h_BA be a hunk to be inserted in delta_BA ;
        h_BA.start = h_B.start + offset_B ;
        h_BA.end = h_B.start + offset_B + h_B.length ;
        h_BA.length = 0 ;
        h_BA.data = empty array ;

offset_B = offset_B + h_B.length - ( h_B.end - h_B.start
) ;

// re-insert the data of A (which had been replaced by
h_B in B)
        // from the corresponding portions of Base and
delta_BaseA
        {offset_A, h_BA} = Insert( Base, delta_BaseA, offset_A,
h_B, h_BA ) ;

append h_BA to delta_BA ;
    end for return delta_BA ;
end
```

FIG. 5B

```
Discard ( cut, delta_BaseA, offset_A )
begin
    for every hunk h_A in delta_BaseA in order starting from front
    do
        if offset_A + h_A.start >= cut then
            return ;  // gone far enough. this hunk onwards will
be handled in Insert(...).
        end if if offset_A + h_A.start + h_A.length <= cut then
            // whole of this hunk lies before cut,
            // so discard the whole hunk and advance offset_A.
            offset_A = offset_A + h_A.length - ( h_A.end -
h_A.start ) ;
            discard h_A from delta_BaseA as this hunk is
irreplaced in delta_AB ;
            continue ;
        else
            // some portion of this hunk lies before cut and
some after,
            // so divide h_A, discarding the portion before cut.
            /* Discarded hunk portion:
             *   start = h_A.start ;
             *   end = min( cut - offset_A, h_A.end ) ;
             *   length = ( cut - offset_A ) - h_A.start ;
             *   data = h_A.data ;
             *
             * Retained hunk portion:
             *   start = discard.end = min( cut - offset_A,
h_A.end ) ;
             *   end = h_A.end ;
             *   length = h_A.length - discard.length
             *          = offset_A + h_A.length + h_A.start -
cut ;
             *   data = h_A.data + discard.length
             *        = h_A.data + ( cut - offset_A ) -
h_A.start ;
```

(Continued from FIG. 5C)

```
            *
            * offset after discarding former hunk portion:
            *      offset_A = offset_A + discard.length - (
discard.end - discard.start )
            *               = offset_A + {( cut - offset_A ) -
h_A.start} - ( discard.end - h_A.start )
            *               = cut - discard.end
            *               = max( offset_A, cut - h_A.end ) ;
            */ h_A.end = h_A.end ;
            h_A.length = offset_A + h_A.length + h_A.start - cut ;
            h_A.data = h_A.data + ( cut - offset_A ) - h_A.start ;
            h_A.start = min( cut - offset_A, h_A.end ) ;
            offset_A = max( offset_A, cut - h_A.end ) ;

break ;
        end if
    end for return offset_A ;
end
```

FIG. 5D

```
Insert ( Base, delta_BaseA, offset_A, h_B, h_BA )
begin
    /* need to copy data into h_BA.data
     * from between positions h_B.start and h_B.end of file A.
     */ let copyStart = h_B.start ;

for every hunk h_A in delta_BaseA in order starting from front
    do
        if h_A.start + offset_A >= h_B.end then
            break ;   // gone far enough. will be handled for
the next hunkB.
        end if
        assert h_A.start + offset_A >= h_B.start ;
        if copyStart < h_A.start + offset_A then
            // need to copy some data from Base preceding h_A
            let copyLen = h_A.start + offset_A - copyStart ;
            h_BA.length += copyLen ;
            h_BA.data.append( Base + (copyStart - offset_A) ,
copyLen ) ;    // append copyLen bytes starting from file Base with
cursor starting at (copyStart - offset_A).
            copyStart = h_A.start + offset_A ;
        end if // now copy data from h_A, as copyStart == h_A.start +
offset_A
        copyLen = min( h_A.len, h_B.end - copyStart ) ;
        if copyLen > 0 then
            // some data to be copied
            h_BA.len += copyLen ;
            h_BA.data.append( h_A.data, copyLen ) ;        //
append copyLen bytes from cursor 0 in h_A.data.
        end if
        // adjust h_A and offset
        if copyLen == h_A.len then
            // whole of h_A has been copied, so it can be discarded
now.
            offset_A = offset_A + h_A.len - ( h_A.end - h_A.start ) ;
            delete h_A from the front of delta_BaseA ;
            copyStart = copyStart + copyLen ;
        else (Continued on FIG. 5F)
```

FIG. 5E

(Continued from FIG. 5E)

```
            // some portion of h_A not copied.
            // remove copied portion from h_A and adjust the
remaining h_A.
            // perform the following adjustments in order:
            h_A.end = h_A.end ;
            h_A.start = min( h_A.end, h_B.end - offset_A ) ;
            h_A.length = h_A.length - copyLen ;
            h_A.data = h_A.data + copyLen ;
            /* offset_A = offset_A + copyLen
                        - ( h_A.start + offset_A - copyStart
                  )
                  = copyLen - ( h_A.start - copyStart )
            */
            offset_A = copyLen - ( h_A.start - copyStart ) ;
            copyStart = copyStart + copyLen ;

break ;  // no more hunks in delta_BaseA which will
satisfy the assertion above.
         end if
      end for // copy any remaining data from Base between copyStart and
h_B.end
      if copyStart < h_B.end then
         copyLen = h_B.end - copyStart ;
         h_BA.length += copyLen ;
         h_BA.data.append( Base + copyStart - offset_A, copyLen )
;   // append copyLen bytes starting from file Base with cursor
starting at (copyStart - offset_A).

copyStart = h_B.end ;
      end if

/* Optimization:
       * ------------------
       * We can possibly reduce the size of delta_BA by detecting
       * if certain replacing portions of delta_AB are common with data in
A.
       * So, we could perform diff( h_B.data, h_BA.data ) and thus,
accordingly
       * break h_BA into smaller non-common hunks.
       */ return { offset_A, h_BA } ;
end
```

FIG. 5F

METHOD AND APPARATUS FOR NAMESPACE VERSIONING

RELATED APPLICATION

This application is a divisional of U.S. application Ser. No. 13/161,507, entitled "Method and apparatus for digital asset management" by inventors Rahul Bhargava, Siddharth Srinivasan, Om Prakash, and Kunjan Aggarwal, filed 16 Jun. 2011, the contents of which are herein incorporated by reference in their entirety for all purposes. U.S. application Ser. No. 13/161,507 claims benefit of U.S. Provisional Application No. 61/356,025, entitled "Method for visually managing the workflow and multiple versions of digital assets," by inventors Rahul Bhargava, Siddharth Srinivasan, Om Prakash, and Kunjan Aggarwal, filed 17 Jun. 2010, the contents of which are herein incorporated by reference in their entirety for all purposes.

BACKGROUND

This disclosure generally relates to digital asset management. A digital asset can generally be any object of value to a user or organization that resides on a computer system. For example, a digital asset can be a digital file or directory that is of interest. Digital Asset Management (DAM) can generally refer to a collection of methods and/or systems for managing digital assets. Specifically, a DAM system (e.g., a computer system that includes DAM software) can provide features such as search and version control to manage the digital assets.

Version control, in general, allows users to save and maintain various successive versions of a digital asset as the users modify them. This can provide an insurance of some sort from errors that a user may make while modifying an asset, as the previous correct version is always available. Further, version control also allows the possibility of merging changes that have been made among different versions to create the next asset version.

DAM can be used by a wide range of users, such as computer software professionals, creative professionals, and home users. Conventional DAM systems suffer from many drawbacks, such as low performance, inability to properly handle certain use cases, and non-intuitive user interfaces.

SUMMARY

Some embodiments described in this disclosure provide methods and apparatuses for digital asset management. Specifically, some embodiments provide a high-performance DAM system that intuitively fits in with various workflows that are commonly used by software and creative professionals.

An embodiment can receive a change in a name or a namespace of a digital asset in an existing namespace version, wherein the existing namespace version includes an existing set of identifiers corresponding to the digital asset. Specifically, the existing set of identifiers can include a first identifier whose value uniquely identifies the digital asset, a second identifier whose value specifies a name of the digital asset, a third identifier whose value identifies a branch, and a fourth identifier whose value identifies a parent. Next, a new namespace version can be created that includes a new set of identifiers corresponding to the digital asset, wherein at least one identifier in the new set of identifiers has a different value than a corresponding identifier in the existing set of identifiers. Additionally, the new set of identifiers can be associated with a path status variable that indicates a type of the change in the name or the namespace that was made to the digital asset.

An embodiment can detect that a merge is being performed between two or more namespaces. Next, the embodiment can generate a dependency graph based on the two or more namespaces. The embodiment can break a cycle in the dependency graph by creating a temporary change state for a node in the cycle. The embodiment can then identify disjoint connected components in the dependency graph. Next, the embodiment can concurrently merge the namespace portions associated with each disjoint connected component by processing nodes in dependency chains in the dependency graph in reverse order. The embodiment can then restore the temporary state of the node to a target state.

A conflict may be detected during concurrently merging the namespaces. Specifically, the detected conflict can be one of: a data conflict, a name conflict, or a dependency conflict. A data conflict can occur when target states for an asset in a working copy and in a repository copy both contain file data modifications. A name conflict can occur when target states for the asset in the working copy and in the repository copy both contain name or namespace changes. A dependency conflict can occur when an asset's changes depend on another asset's changes for which a conflict has been detected. When a conflict is detected, the embodiment may prompt a user with a set of options to resolve the conflict. The embodiment may resolve the conflict based on a set of rules. Specifically, the embodiment may resolve data conflicts before resolving name and dependency conflicts.

BRIEF DESCRIPTION OF THE FIGURES

FIGS. 5B-5F present pseudo-code for a process for computing an inverse delta in accordance with some embodiments described in this disclosure.

DETAILED DESCRIPTION

Figure 1:
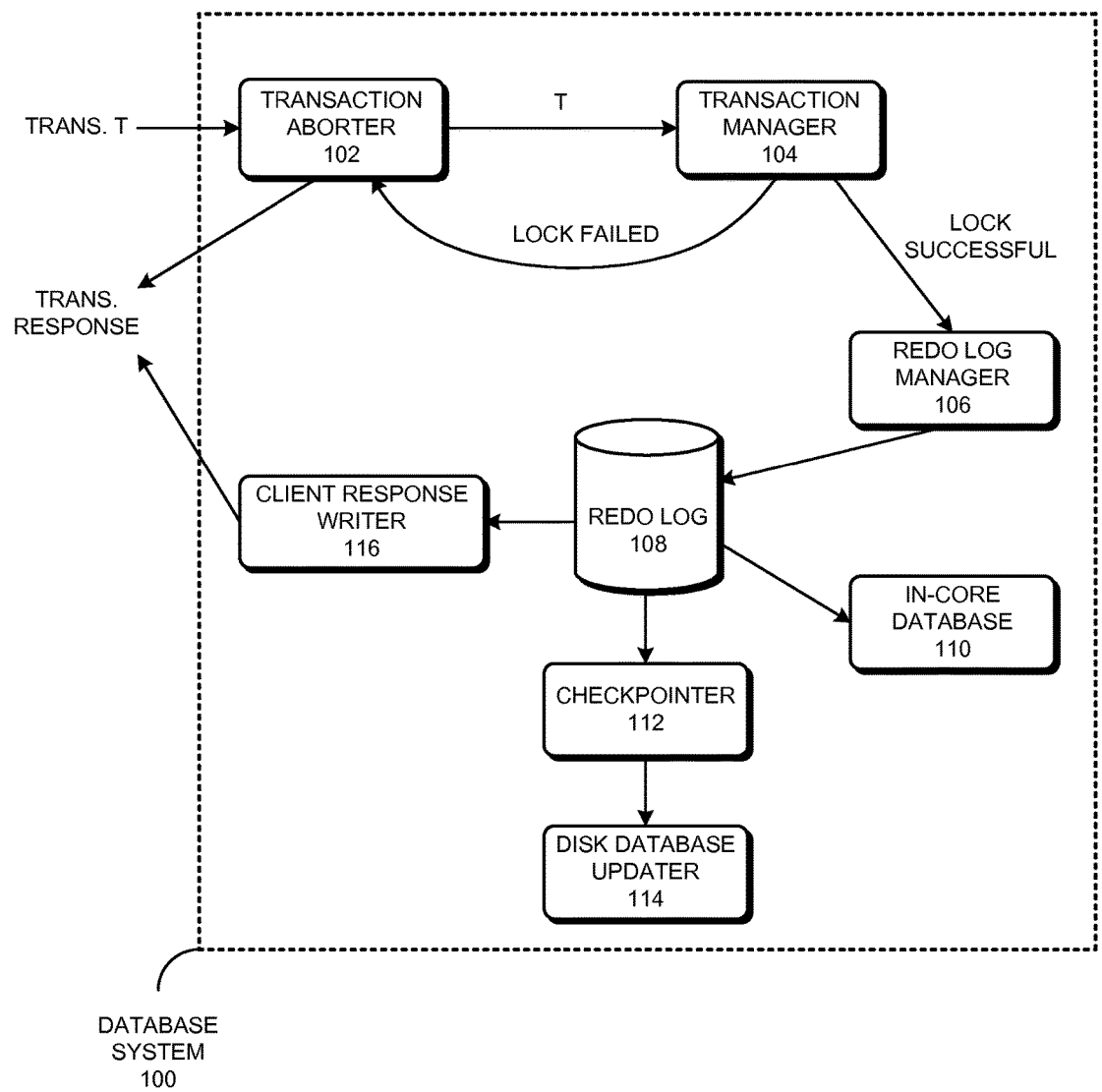
FIG. 1 illustrates a database system in accordance with some embodiments described in this disclosure.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

It is desirable for a database server (e.g., a database server that is used to manage digital assets) to guarantee the following properties for each transaction: (1) atomicity, i.e., either all the changes should be stored or none at all; (2) consistency, i.e., either the transaction commits and creates a new consistent state or is rolled back restoring the database to a consistent state; (3) isolation, i.e., if two transactions arrive simultaneously at the database server, the state should not get mixed up due to interleaving; and (4) durability, i.e., if the database server has an unplanned shutdown, the changes need to be preserved across server restart. This set of four properties is hereinafter referred to as the "ACID properties."

Conventional DAM systems often store a link to the digital asset file and are unable to guarantee one or more of the above-described properties resulting in corruption of the data or loss of files.

It is desirable for a version control system (VCS) that is part of a DAM system to support the following features: (1) import/add assets into the VCS; (2) commit modifications to assets in the VCS; (3) list the various assets and directory structure in the VCS; (4) checkout a working copy of one or more assets at a particular revision from the VCS repository; and (5) update one or more assets in a working copy from the present revision to another revision, usually, the latest revision.

Digital assets can be large binary files with irregular data patterns. In a multimedia project it is relatively easy for a creative professional to generate a large number of versions of a digital asset. For instance, while producing an animation of a cartoon character, a creative professional might generate an uncompressed video file of size 15 gigabytes (GB) for a 5 minute video clip. As the creative professional makes changes to the animation file, he/she might end up with 20 versions of the 15 gigabyte file.

In such situations, the system faces the problem of storing these versions for future retrieval. If each of the 20 versions is stored independently, it may require 300 GB of storage. Compression techniques are usually not very effective at compressing such files because the data is usually very random without any discernable patterns and/or the video is stored in a compressed format. Additionally, other team members working on the project may need to use or checkout the file versions and make their own changes. The team members may also need to create more such files for their own task. It is easy to imagine scenarios in which a single project may need to store and track hundreds of thousands of files, each having multiple versions. Conventional DAM systems have serious performance and scalability issues when they are used for projects that have a large number of binary files, each having multiple versions.

In the context of digital file differencing, the term "file delta" refers to the difference between two files, stored in a format that allows one of the files to be converted into the other file.

In a VCS, different versions of a file are typically stored as deltas relative to the previous version. In some embodiments, only the first version of the file is a full file, and all subsequent versions are file deltas. In such cases, deltas are usually fairly small compared to the full files, and the storage cost is very low compared to storing all versions as full files. This approach can also reduce transfer time, when sharing versions of files, as the deltas are small compared to full files.

For example, if two computers have the base file, then the computers may only need to exchange the deltas instead of exchanging the entire file when a new version is created. File differencing can substantially reduce the required storage space of a repository. For example, instead of storing full files "A" and "B," the system may only need to store file "A" and the file delta between "A" and "B."

Many formats can be used for storing file deltas, such as, unified diff format, VCDIFF, bdiff etc. The VCDIFF delta format has been specified in RFC3284 (Korn, D. et al (2002), *"The VCDIFF Generic Differencing and Compression Data Format"*, RFC3284, The Internet Society).

The Bdiff delta format encodes the difference between the source and target files as a series of "replacing fragments" called hunks. Each hunk gives the start and end points of the replaced data of the source file and the new data which replaces it. The replacing data is to be inserted instead of the data between the start point and end point in the source file.

The file delta formats described above are for illustration purposes only and are not intended to limit the embodiments described in this disclosure. Specifically, embodiments described in this disclosure can generally use any file delta format.

The notation d(A, B) is used in this disclosure to denote the difference between file "A" and file "B." Note that applying delta d(A, B) to file "A" produces file "B." However, file "A" cannot be obtained be applying d(A, B) to file B. To accomplish that, one must compute the reverse delta, namely, d(B, A). Some embodiments described in this disclosure provide methods and apparatuses for efficiently computing a reverse delta.

As mentioned above, conventional DAM systems have serious performance problems in part due to the large sizes of the digital assets under management. For example, conventional DAM systems operating on the latest hardware systems can take over 1,500 seconds to store 67,000 files in a single transaction. In some cases, this can be an unacceptably large amount of time. Some embodiments described in this disclosure can substantially reduce the amount of time required to perform such transactions.

If a project is forked, the new project may want to work on a "branch" that is local to it without interfering with the original project. Duplicating files on the new branch may not be desirable as that would cause the storage need to grow linearly with the number of new branches. Some embodiments described in this disclosure can provide methods and apparatuses for project branching that have a sub-linear relationship between the storage requirement and the number of branches.

The project team may every now and then rename or move the digital assets by changing folder names, file names, moving folders under a different parent folder. These changes to the namespace of the asset do not affect the data but need to be tracked. It is desirable to enable a user to look at the history of namespace changes and retrieve and recreate the folder or file name at any point in time. Specifically, it may be desirable to prevent users from merging changes across versions or branches of an asset even if the namespace changes. Unfortunately, conventional solutions do a poor job at dealing with namespace changes. Typically, in conventional approaches, such namespace changes can cause the DAM system to get confused and create duplicates or lose files.

In conventional VCSs, a file is typically viewed as a container for data. This has led to two popular approaches of identifying files by VCS and DAM systems. One approach is to identify a file by its full path name inside the data store or repository. This approach has the advantage of being able to identify directories as well. The other approach is to identify a file by a hashed digest of its contents. One of the disadvantages of this approach is that it cannot recognize directories as they do not contain any data in them.

Unfortunately, both of these popular approaches fail to operate properly when users perform name changes of assets as well as their deletion and resurrection of deleted assets. In this disclosure, such changes are referred to as "namespace changes." Specifically, the following operations are considered to be namespace changes: (1) addition of assets, (2) renaming of assets, (3) moving of an asset from one directory path to another directory path, (4) deletion of assets, (5) resurrection of deleted assets, and (6) branching of assets.

The term "namespace," as used in this disclosure, refers to the context for the identifying name. For example, in a file-system under the control of a computer operating system, the namespace of an asset can be the directory path in which it resides, and is named.

Conventional approaches for asset identification essentially reduce all namespace changes to a combination of following two basic operations: addition of assets and deletion of assets. For example, if file "alpha.txt" is renamed to "beta.txt" then a conventional VCS using pathname identifiers would not be able to recognize that "beta.txt" refers to the same asset earlier known as "alpha.txt". A conventional VCS that uses a hashed digest of the file's contents would be able to do so as long as the data in the file has not been modified. However, oftentimes work proceeds in parallel and modifications are made to both a file's data as well as namespace by two or more users in their separate copies.

Further, a lot of complications arise in conventional approaches when we need to merge all the work back together.

In conventional approaches, merging of the data and namespace changes can only be performed once the separate copies of the file are associated with each other. To achieve this, conventional systems typically use heuristics. Unfortunately, these heuristics are usually ad hoc and lack a sound theoretical basis. For example, some conventional approaches check whether the file being deleted has the same hash value as the file being added. However, this approach does not provide any guarantees since two completely different files may generate the same hash value. Furthermore, hash-based approaches run into serious problems when one user moves a file from one directory to another, and another user changes the name of the file.

A VCS can be used by various organizations, in fields varying from software development to multimedia content development, to manage versions of their digital work assets. While working on projects, the operations of a VCS are extensively used while performing file creation, modification, and various other operations. A project is typically divided in to sub-projects, and each sub-project is divided into sub tasks. Each task may be performed by an individual or by a team, and usually needs to be completed within a specified amount of time. A project is said to be complete when all of the constituent tasks have been completed. Further, only when a task is considered to have been performed satisfactorily is it considered to have been completed. Manually managing and tracking tasks is a tedious and time consuming job.

A workflow management tool can be very useful in such situations. Specifically, a workflow management tool can enable users to create projects, create workflows, and define tasks. The workflow management tool can also allow a project manager to monitor project's progress precisely and quickly. A workflow management tool can update users about their forthcoming tasks, due dates, approvals, rejections, etc. If a project uses a VCS to keep track of file versions, then using a workflow management tool which is not integrated with the VCS can result in operator error and loss of productivity. Some embodiments described in this disclosure provide methods and apparatuses for integrating VCS functionality with workflow management.

In a typical organization that uses a VCS, hundreds of asset creation and modification commits may happen each day, where, a single commit may include multiple files added or modified. Each commit contributes to a revision in the repository. In such cases, it may be difficult to know which files in which revision are stable.

Some VCSs offer users the feature to add tags to certain revisions of assets. However, tagging a version of an asset as "stable" is prone to human error. Further, the system may not be able to guarantee that all of the asset versions tagged as stable can reside together physically on a user's working copy due to possible namespace inconsistencies. For example, suppose revision 34 of asset "alpha.txt" is to be tagged as stable. Further, assume that in revision 38, "alpha.txt" is renamed to "workBeta.txt" and various data modifications are made to it in revisions 38, 39, and 40. Also, in revision 38, another file "start.txt" in the same directory is renamed to "alpha.txt". In this case, if stable tagging is not namespace aware, then revision 38 of "alpha.txt" (which was initially named as "start.txt") could be tagged as stable. This would cause the stable versions of both the files (initially named "alpha.txt" and "start.txt") to be named "alpha.txt" residing in the same directory. Therefore, in this case, it would not be possible to have a single working copy with all the assets checked out in it being in a stable state.

Digital assets such as images, animations, videos, etc. are generally large in size, ranging from megabytes to terabytes. The user may be working on a version of a file, but may want to quickly retrieve another version. Fetching the entire version may be impractical due to network bandwidth constraints. Furthermore, depending on the situation, the entire version may not be needed.

For example, the user may merely want to search the metadata of the other version, and may not be interested in the actual data of the other version. Specifically, a creative professional may want to search and/or browse through the previews and meta-information (e.g., aspect ratio, resolution, etc.) associated with creative content before deciding which version of a particular digital asset needs to be downloaded. Unfortunately, conventional VCS and DAM systems do not allow a user to browse and/or search through the previews (e.g., thumbnails) or the metadata associated with digital assets. In conventional approaches, each version of each file has to be available in its entirety at the client (e.g., a user's desktop) before any previews and/or metadata associated with the file version can be accessed at the client. However, downloading a version in its entirety can increase bandwidth consumption and local storage requirements and decrease the response time.

Note that a thumbnail is also an image or a video clip. Therefore, if the system tries to store thumbnails for every single version of all the digital assets in the repository, the network and storage requirements may become impractical. Caching can be used to reduce the bandwidth requirement, but it increases the storage requirement. Even if caching was practical from a network and storage viewpoint, the cache hit ratio may not be very high because versions of files and user requirements can change can change at a very high rate.

Some embodiments described in this disclosure provide methods and apparatuses for keeping track of previews and metadata associated with a file in the VCS without the above-described drawbacks. For example, in some embodiments, the system may generate thumbnails and other metadata associated with digital content, and keep track of the versions of the thumbnails and metadata independently of the digital content. Specifically, in some embodiments, the system can keep the deltas between thumbnail versions, and cache these deltas at the client. If a particular thumbnail version is required by the user, the appropriate set of deltas can be combined to create the thumbnail version. In this manner, these embodiments can allow a user to explore a visual list of files, displaying thumbnails for every revision, before actually deciding on the ones the user wants to use. Note that the network and storage requirements are substantially reduced since the system stores thumbnail deltas.
Database Conventional databases can have severe performance problems if the data that is desired to be stored consists of large unstructured units (e.g., large binary objects or "blobs"). Today's applications need to be optimized for both structured and unstructured data. The term "structured data," as used in this disclosure, can refer to data that is associated with a well-defined organization or schema that describes the underlying data model. Examples of structured data include tables, collection of object oriented classes, data that is organized using XML tags, etc. The term "unstructured data," as used in this disclosure, can refer to data that is not associated with a well-defined organization or schema. Examples of unstructured data include bitmap images and other binary objects (e.g., raw image data from a Camera).

For example, many popular social networking websites allow users to store large number of images (which are blobs) as part of their profile. Similarly, applications used by creative professionals need to store several revisions of their work (which are often blobs) in a database for future retrieval. As an example, some conventional databases can block an application for 1500 seconds for storing 67 thousand new files in the database; this is clearly unacceptable.

Many applications need to store and track arbitrary revisions of a data item. They also need O(1) fetch of arbitrary revision of a data item. Storing revisions of a data item could be mandated by compliance requirements, the ability to go back in time, search through history or recover from system problems. Mapping such applications on top of existing database design leads to compromises such as storing a new linked-in file for each version causing disk space to explode. Some approaches improve performance by sacrificing the ACID properties that are desirable in a database. Unfortunately, not guaranteeing the ACID Properties can lead to data corruption.

Some embodiments described in this disclosure provide a high-performance transactional database system that can guarantee the ACID properties while storing multiple versions of large amounts of unstructured data.

FIG. 1 illustrates a database system in accordance with some embodiments described in this disclosure.

In some embodiments, database system 100 can include multiple modules, such as transaction aborter 102, transaction manager 104, redo log manager 106, redo log 108, in-core database 110, checkpointer 112, disk database updater 114, and client response writer 118. These modules can be embodied in hardware and/or software. FIG. 1 has been provided for illustration purposes only, and is not intended to limit the scope of the embodiments described herein. Specifically, various modifications and variations will be apparent to those skilled in the art. For example, a module shown in FIG. 1 may be split into multiple sub-modules, and/or multiple modules shown in FIG. 1 may be combined into a single module.

Aborter 102 can receive transaction T and check whether or not the transaction satisfies a set of invariants. Invariants are pre-conditions that can be attached to a transaction payload. Each table defined by the application can generally have any number of invariants. If aborter 102 determines that one or more invariants associated with transaction T is false, aborter 102 can abort the transaction without queuing the transaction at transaction manager 104. Transaction manager 104 can also notify aborter 102 if transaction manager 104 needs to abort the transaction for any reason.

In some embodiments, transaction manager 104 can use a multi-version concurrency control (MVCC) mechanism that allows read transactions to proceed without obtaining any locks. The read transactions can be kept isolated from write transactions using a volatile "dirty object" mechanism that does not require locking Transaction manager 104 can implement a "serializable" isolation level without needing range locks like RDBMS or requiring expensive rollback mechanisms. Thus, even though transactions are performed concurrently, an illusion of serial operation can be maintained without a large performance overhead or restriction on concurrency.

For write transactions, transaction manager 104 can attempt to obtain exclusive write locks needed on the resources that are being modified. In some embodiments, database system 100 can allow the database schema designer to override the default locking strategy for each table in the database schema. Each resource that participates in a transaction can have an associated resource control block (RCB). The RCB can specify the status of the resource, e.g., whether or not the resource is locked, and the lock owner if the resource is locked (e.g., an identifier associated with the transaction that successfully obtained a lock on the resource).

Figure 2:
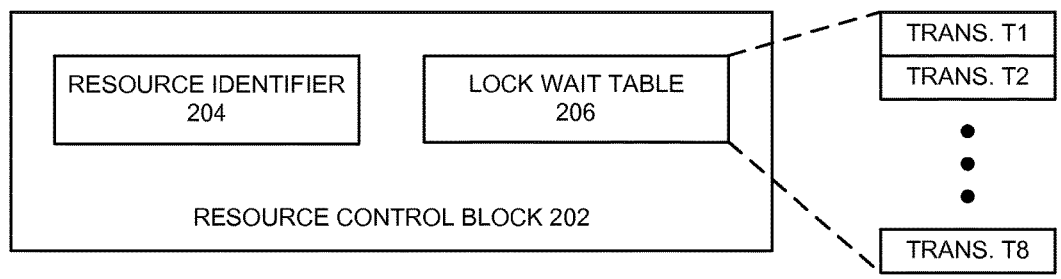
FIG. 2 illustrates a resource control block in accordance with some embodiments described in this disclosure.

FIG. 2 illustrates a resource control block in accordance with some embodiments described in this disclosure.

Resource control block 202 can include one or more data structures, including resource identifier 204 and lock wait table 206. Resource identifier can be a unique identifier associated with a resource. Lock wait table 206 can be a data structure that can be used to keep track of transactions that are waiting to obtain a lock on the resource.

Specifically, in some embodiments, the first transaction listed in lock wait table 206 can be the owner of the lock. For example, transaction T1 in FIG. 2 can be the lock owner. As new transactions are received at transaction manager 104, transaction manager 104 can attempt to obtain a lock on the resources that are required by the transaction. If a resource is currently locked by another transaction, transaction manager 104 can check whether or not the transaction being processed is compatible with the lock owner. If the transaction being processed is compatible with the lock owner, the transaction can be queued in the lock wait table. A transaction is compatible with a lock owner if upon obtaining the lock, the transaction can modify the resource without causing any application data inconsistency. For example, as shown in FIG. 2, transaction T2 is compatible with transaction T1, and therefore is queued in lock wait table 206. Once transaction T1 releases the resource, transaction T2 can immediately operate on the resource without causing any data inconsistencies. In some embodiments, for a transaction to be queued in a lock wait table, the transaction must be compatible with other transactions that are queued before it. For example, in the example shown in FIG. 2, for transaction T8 to be placed in lock wait table 206, the system may require that it be compatible with transactions T1-T7. Although eight transactions (T1-T8) are shown in lock wait table 206, lock wait table 206 can generally store an arbitrary number of transactions.

Incompatible or conflicting transactions can be aborted immediately without placing them in the lock wait table. Checking for lock compatibility can help maximize concurrency based on resource usage as opposed to a blind locking approach that is used in some conventional approaches. Note that even if a transaction is compatible (and therefore placed in the lock wait table), the transaction may still be aborted due to a multitude of reasons. For example, the transaction may be aborted due to violating an invariant.

Some embodiments described in this disclosure support table locking or key locking within a map data structure. With key locking, any key used in a hash map can be used as the lock. This allows the application flexibility without burdening them with lock semantics. In some embodiments, the locking mechanism is implemented entirely in physical memory (as opposed to disk). In these embodiments, the locking mechanism can be substantially faster and efficient when compared with some conventional approaches which may need to perform cross process synchronization and hence need lock book-keeping to be in a persistent state (i.e., on disk).

The following lines of code show an example of a "resourceType" declaration that can cause a database schema compiler to use a FUID (file unique identifier) as the key level lock during a write transaction.

```
<ComplexType id="FileIndex" db="true">
    <MapType      id="fuid2Index"      key="fuid"
        resourceType="FileId" value="FileIndexMap"/>
</ComplexType>
```

Continuing with the description of FIG. 1, redo log manager 106 can play the role of a database recovery mechanism. For example, if database system 100 crashes or is restarted, redo log manager 106 can reliably recover committed transactions using redo log 108. Some embodiments described in this disclosure can eliminate the need for an undo log, as explained below. Note that redo log manager 106 helps guarantee the durability property (one of the ACID properties), even for transactions with unstructured data.

When database system 100 receives a commit transaction, a redo log record can be created for the transaction and its data. The redo log record can then be appended into redo log 108. Once a confirmation has been received that the log record is in a stable state, the commit transaction can be declared as being successfully committed. The feature of appending the redo log record can substantially improve performance of some embodiments described herein when compared with conventional techniques that do not use this approach. Specifically, when redo log records are always appended to the redo log, the system can stream data at a very fast rate into the redo log since the system does not have to wait for individual database files and folders to be populated on disk.

For example, when adding and/or importing new digital assets into the database, some embodiments described herein can achieve more than a 50X speedup over comparable conventional databases. In particular, in a benchmark test that involved importing 67 thousand files, some embodiments described herein were able to import the files in about 30 seconds versus conventional approaches that took more than 1500 seconds to perform the same task.

Figure 3A:
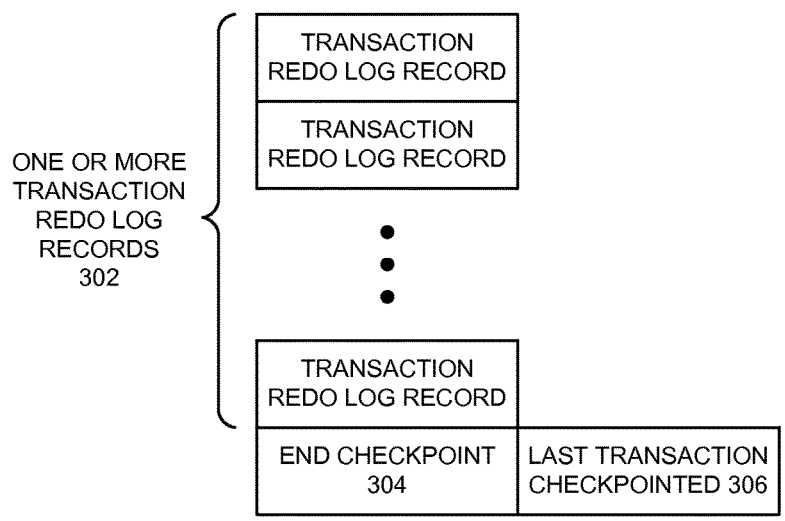
FIG. 3A illustrates how transaction redo log records can be appended to a redo log in accordance with some embodiments described in this disclosure.

FIG. 3A illustrates how transaction redo log records can be appended to a redo log in accordance with some embodiments described in this disclosure.

One or more transaction redo log records 302 can be appended to a redo log. A marker, e.g., end checkpoint marker 304, can be added after the one or more transaction redo log records 302 to indicate the end of a batch of transaction redo records that were appended to the redo log. A flag, e.g., last transaction checkpointed 306, can follow the end checkpoint marker to indicate whether or not the one or more transaction redo log records 302 have been checkpointed (e.g., successfully written to disk).

Figure 3B:
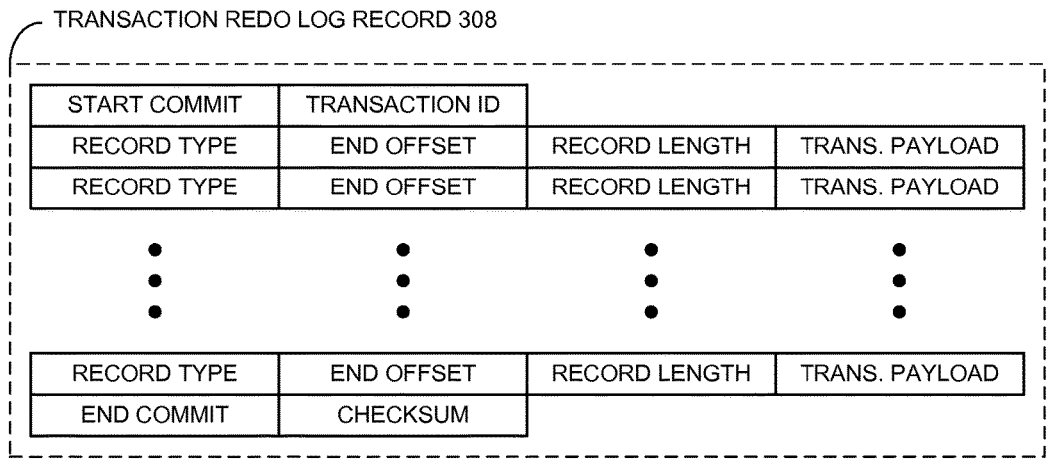
FIG. 3B illustrates a transaction redo log record in accordance with some embodiments described in this disclosure.

FIG. 3B illustrates a transaction redo log record in accordance with some embodiments described in this disclosure.

Transaction redo log record 308 can include a marker (e.g., "start commit") to indicate the start of a transaction and then for each payload (typically a data record being modified in a table) a log record can be inserted. As shown in FIG. 3B, each log record can have a "record type" field, an "end offset" field, a "record" field, and a "transaction payload" field. To indicate the end of a transaction redo log record, another marker, e.g., an "end commit" marker, along with a rolling checksum, computed based on the data payload, can be inserted.

The "record type" field in conjunction with the "record" field can specify the type of operation that needs to be performed. Specifically, in some embodiments described in this disclosure, the combination of these fields can be used to specify "commands" like a copy task into the log records.

This approach can allow the database system to copy file segments using transactional semantics. The "end offset" field can indicate the byte offset in the database physical file where the data modification starts. This field can help guarantee ACID properties for unstructured data like files and binary large objects (blobs). Specifically, in some embodiments, the copy task copies unstructured data (e.g., blobs) starting at the offset specified in the "end offset" field. If a system crash occurs during this copy operation, the system can simply try to copy the data again from the offset specified in the copy task. Since the copy task is atomically appended to the redo log, it guarantees the integrity of the database even across database crashes and restarts. As mentioned before, for performance reasons, the redo log and database files are always appended to. Whenever a record changes, a new version of the record is appended. In this manner, some embodiments described herein can eliminate most of the cost of modifying physical data pages that are incurred by conventional databases.

Redo recovery refers to the task of updating the various physical database files on disk which have been modified through the various write transactions whose log records are stored in redo log 108. Some embodiments described in this disclosure can use a two pass process for recovering transactions in the redo log. In some embodiments, this recovery process is always run on server startup. Specifically, during this recovery process, any transactions that have not been check-pointed as yet can be recovered.

During the first pass, the system can perform the following operations. The system can first obtain a reverse list of redo log files, i.e., in this list the first file is the most recent file (in some embodiments, each file can have a strictly monotonically increasing redo file number). Next, for each redo log file in the list, the system can scan for start/end commit markers and end checkpoint records. Other types of records are skipped in this pass.

If a start commit record is found, the system can extract and keep track of the transaction identifier, file pointer, redo file number. If an end commit record is found, the system can set the end offset of the transaction and set the checksum.

If the transaction identifier is less than or equal to the last checkpoint (which indicates that this transaction has already been checkpointed), the system can skip the transaction record (i.e., the portion between the start commit marker and the end commit marker). On the other hand, if the transaction identifier is greater than the last checkpoint (which indicates that the transaction has not been checkpointed), the system can save this transaction to a "commits that need to be performed" list.

If a checkpoint record is found, the system can prune the "commits that need to be performed" list to reflect only uncommitted transactions. In some embodiments, checkpointing can always be done with increasing transaction identifiers. In such embodiments, the system can determine to terminate the first pass and skip visiting any other files. Note that, unlike conventional databases that can have several log writers concurrently writing to multiple redos, some embodiments described herein write to a single redo log, thereby eliminating the need for complex recovery of uncommitted transactions.

In the second pass of the recovery process, the system can perform the following operations for all the transaction records saved in the "commits that need to be performed" list that was generated in the first pass. First, the system can invoke a redo operation on each record found between the start and end commit markers. Next, the system can open the database at the specified end offset and append bytes specified in the log record payload. For log records that refer to commands like copy, the system can trigger the execution of the command. Specifically, in some embodiments, the redo log manager supports attaching custom code/programs to a transaction record. This mechanism can be used in by the system to execute a copy task, which copies file data from redo transaction files to their individual asset files atomically.

The system can then insert an "end checkpoint" record or marker with the last transaction up to which transactions have been recovered in the previous operations. The "end checkpoint" record or marker indicates to any subsequent redo recovery process that these transactions have been committed and checkpointed, and therefore can be skipped.

If the redo phase fails due to partial writes in the redo log file, e.g., the redo log file is corrupted because of hardware or power failures, then the system administrator can execute an "undo" command that can undo the last transaction commit that partially failed due to bad data in the redo log. This "undo" operation is simple and safe due to the append-only nature of the database files and since the offset at which the transaction bytes were inserted into the database is an integral part of the redo log record.

Some embodiments described in this disclosure are designed to take advantage of 64-bit computing with large amounts of available RAM. Specifically, in some embodiments, database files are loaded in memory as a graph of Java objects. For example, in-core database 110 shown in FIG. 1 is an example of a database that entirely resides in physical memory and is based on a graph of Java objects.

Unlike conventional databases, in some embodiments, all read queries can be performed in memory without any disk seeks. As mentioned before, in some embodiments, read operations do not require obtaining a lock. This can substantially improve the performance of read operations. In some embodiments, each table that is modified by a transaction is never directly mutated. Instead, in these embodiments, the system creates a new object graph with all the mutations inserted into the new object graph. The new object graph is then applied to the database that is stored in physical memory via a method call. Depending upon the semantics desired by the application, when a write transaction successfully commits, the in-memory database will be either updated from the new object graph or appended to.

A transaction commits after the redo log manager releases its lock on it. For each table that was modified a call-back method to update the in-memory record can be triggered. In this manner, each transaction can modify the tables in the in-memory database. To avoid phantom reads and other consistency issues, some embodiments have a pointer to a "dirty object" attached or associated to a write transaction and each record that is being modified by the write transaction. For example, the dirty object can have a single boolean "isDirty" flag. A transaction can attach the dirty object reference to each element of the collection it modifies including any hash map keys that are inserted. While the write transaction is updating in-memory tables, the isDirty flag can be set to be true to indicate that the data objects are being modified. Once all of the updates are complete, the system can set the isDirty flag to false. This indicates to any subsequent read transactions that the object is no longer being mutated. Using a single instance of a dirty object per transaction can allow the system to atomically reset the dirty flag to false for all records, even from multiple tables, that were involved in the transaction.

During a read transaction, any object whose isDirty flag is true can be ignored without using any locking. The isDirty flag can use a special "volatile" keyword supported by Java Virtual Machine to synchronize without using explicit locking. Once the isDirty flag is set to false, the transaction can release all the resources/locks that were held.

Note that, in some embodiments, read transactions will ignore any dirty objects—keys or collection elements. When the transaction is ready to commit, the system can set the isDirty flag to be false. In this manner, the system can allow changes to multiple collections to become visible atomically. Note that, some embodiments described in this disclosure can easily handle read-write conflicts because read transactions work on the last known stable records and ignore any dirty records (i.e., records that are being updated). Therefore, in some embodiments described herein, there is no need for book-keeping read-locks or read-timestamps.

Checkpointer 112 can be a module that periodically applies the committed transactions in the redo log to the physical database on disk. Checkpointer 112 can also perform the redo recovery process when the server is restarted. As explained above, the checkpointed transactions can be marked as done by inserting an "end checkpoint" record or marker in the redo log with the transaction identifier of the last transaction that has been checkpointed.

Checkpointed transactions can be ignored by the recovery manager during startup to speed up the server restart. Checkpointer 112 can run in a separate thread pool as a low priority task that does not impose much load on the server. In some embodiments, prior to checkpointing, if a client (e.g., an application) needs unstructured data (which is not stored in in-memory database tables) that was committed, the system can read data directly from the redo log and stream it to the client (e.g., the application that requested the unstructured data). This approach can further speed-up the read operation for most recently committed data as the redo file usually stays in the operating system's (OS) buffer cache for some time after a disk write.

When checkpointer 112 wants to copy data from the redo log to the separate database files on the physical disk, it can invoke disk updater 114. Disk updater 114 can use a fast disk I/O native module to speed up file to file transfer. For example, disk updater 114 can take advantage of special system calls like "splice" on Linux to transfer bytes from one file handle to another file handle completely within the OS kernel.

Client response writer 116 can be responsible for serializing data to the client. Specifically, a network compiler can be used to generate code that knows how to efficiently transfer graphs of objects from the server to the client. Additionally, client response writer 116 can be capable of streaming large files without first copying all of the bytes of the large files into physical memory.

Figure 4A:
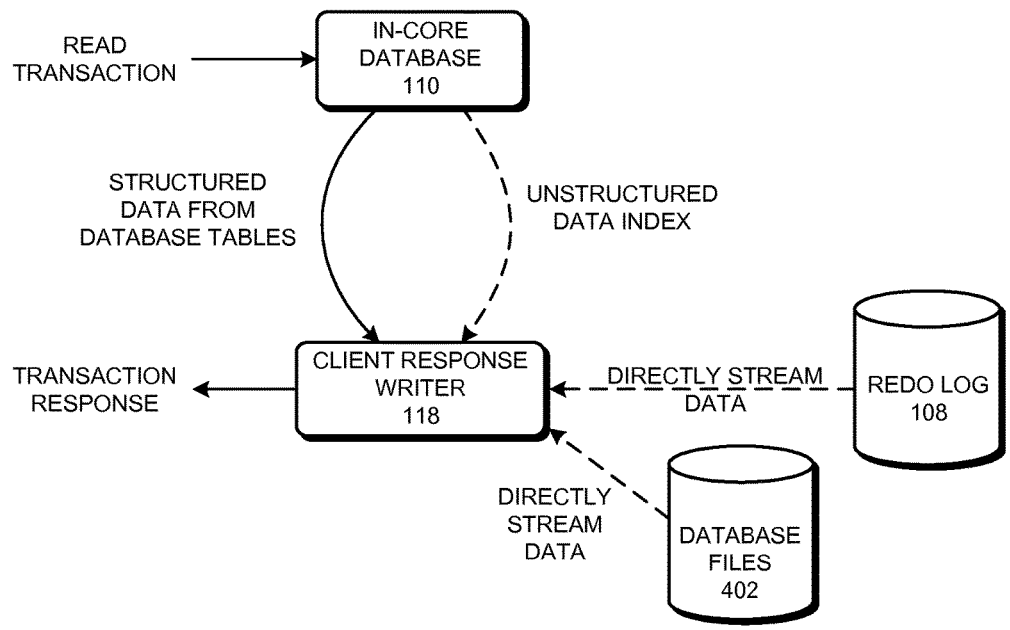
FIG. 4A illustrates how a read transaction can be processed in accordance with some embodiments described in this disclosure.

FIG. 4A illustrates how a read transaction can be processed in accordance with some embodiments described in this disclosure.

As discussed above, read transactions do not require obtaining any locks. Specifically, read queries can use in-core database 110 and may not need to read database files 402 from disk for the structured data. Further, some embodiments can use the "dirty object" to skip over data items and hash keys which are being mutated by write transactions, and "sequential" isolation level can be guaranteed by these embodiments without any locks or timestamp based book-keeping.

The unstructured data, such as blobs and data files, can be indexed in in-core database 110, and hence, can be directly streamed from disk (from either database files 402 or redo log 108) by the client response writer 118. As explained above, read transactions can proceed lock-free due to the use of "dirty object" to skip over data items being modified. This can eliminate the delay for obtaining read locks or the delay incurred during complex lock checking.

Figure 4B:
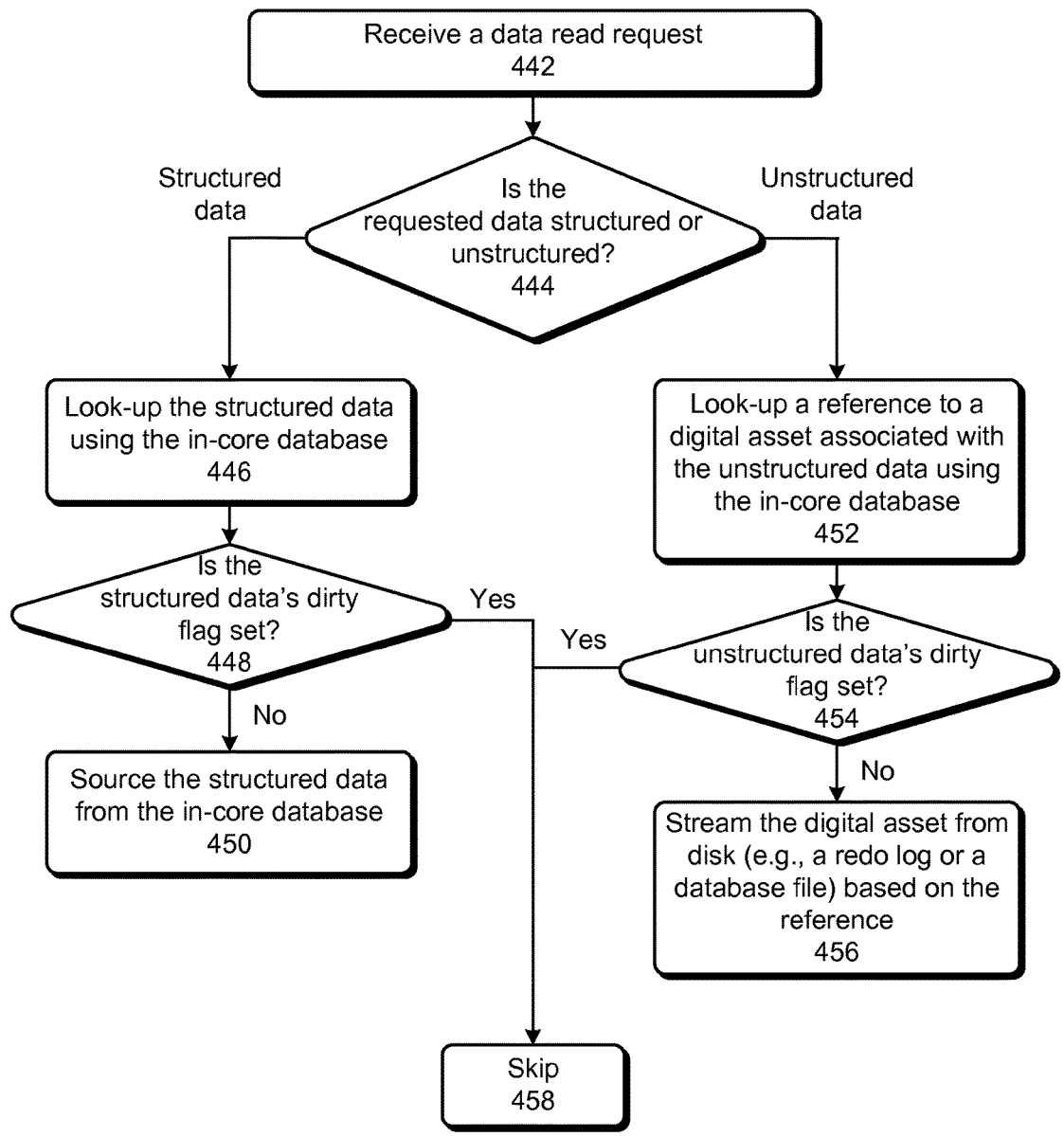
FIG. 4B presents a flowchart that illustrates a process for processing a read request in accordance with some embodiments described in this disclosure.

FIG. 4B presents a flowchart that illustrates a process for processing a read request in accordance with some embodiments described in this disclosure.

The process can begin by a database system receiving a data read request (operation 442). Next, the database system can check whether the requested data is structured or unstructured (operation 444). If the requested data is structured, the database system can look-up the structured data using the in-core database (operation 446). Next, the database system can check if the structured data's dirty flag is set (operation 448). If so, the database system can skip the read request (operation 458). If not, the database system can source the structured data from the in-core database (operation 450).

On the other hand, if the requested data is unstructured, the database system can look-up a reference to a digital asset associated with the unstructured data using the in-core database (operation 452). Next, the database system can check if the unstructured data's dirty flag is set (operation 454). If so, the database system can skip the read request (operation 458). If not, the database system can stream the digital asset from disk (e.g., a redo log or a database file) based on the reference (operation 456).

In some embodiments, a write transaction can be processed as follows. An application writer can create a transaction object and append transaction payloads to the transaction object. The transaction payload can be the root of the new object graph corresponding to each table that needs modification.

As explained above in reference to FIG. 1, the write transaction can be first submitted to an aborter that checks the invariants to see if the transaction needs to be aborted. If the transaction is valid, the aborter can submit it to a transaction manager. The transaction manager can then try to obtain locks for resources that are used in the transaction. Depending upon lock compatibility for the resources, the transaction may be blocked or be placed in a wait queue. Once the transaction makes it out of the transaction manager, it has all of the locks it needs and is guaranteed to be the only writer for the resources it is modifying. In some embodiments, only write transactions may be submitted to the transaction manager since read transactions are lock-free. After obtaining the locks, the transaction manager can check the invariants on a transaction and send the transaction back to the aborter if one or more invariants have been violated.

Next, the transaction can be processed by the redo log manager, which can obtain a lock on the redo log to "serialize" writing to the shared redo log. The redo log manager can insert the transaction and its data in to an append-only redo log. A checksum can be computed to ensure integrity. As soon as a confirmation is received from the redo log, the transaction can be declared as being committed and the client response writer can notify the client accordingly. In this manner, some embodiments described in this disclosure can achieve extremely fast write operations, especially those involving many database files because transactions are completed without waiting for the various database files to be updated on disk.

The transaction can then be processed to update the in-memory records stored in the in-core database tables. The in-memory tables can use a lock-free "dirty object" to keep transactions from reading uncommitted data. Once the in-memory updates are complete, the dirty object's state can be changed to clean (e.g., by setting the value of the isDirty flag to false) and all the uncommitted data can become available atomically to other transactions. At this point, the redo log manager can release the redo lock and allow the next transaction to be processed.

The client response writer can notify the client as soon as the redo log manager flushes the record to disk. Note that the client does not have to wait for the physical databases on disk to be updated (because the writing to disk is done asynchronously in the background), thereby increasing the write performance tremendously.

In the background, the checkpointer module's threads can apply the committed data in redo log to the physical database. The in-core database tables may initially point to the data in redo log but once checkpointing finishes, the pointers in the in-core database tables can be swizzled (i.e., modified) to point to the physical database. This technique is especially useful when large binary objects that can't be stored in-memory are involved.

Figure 4C:
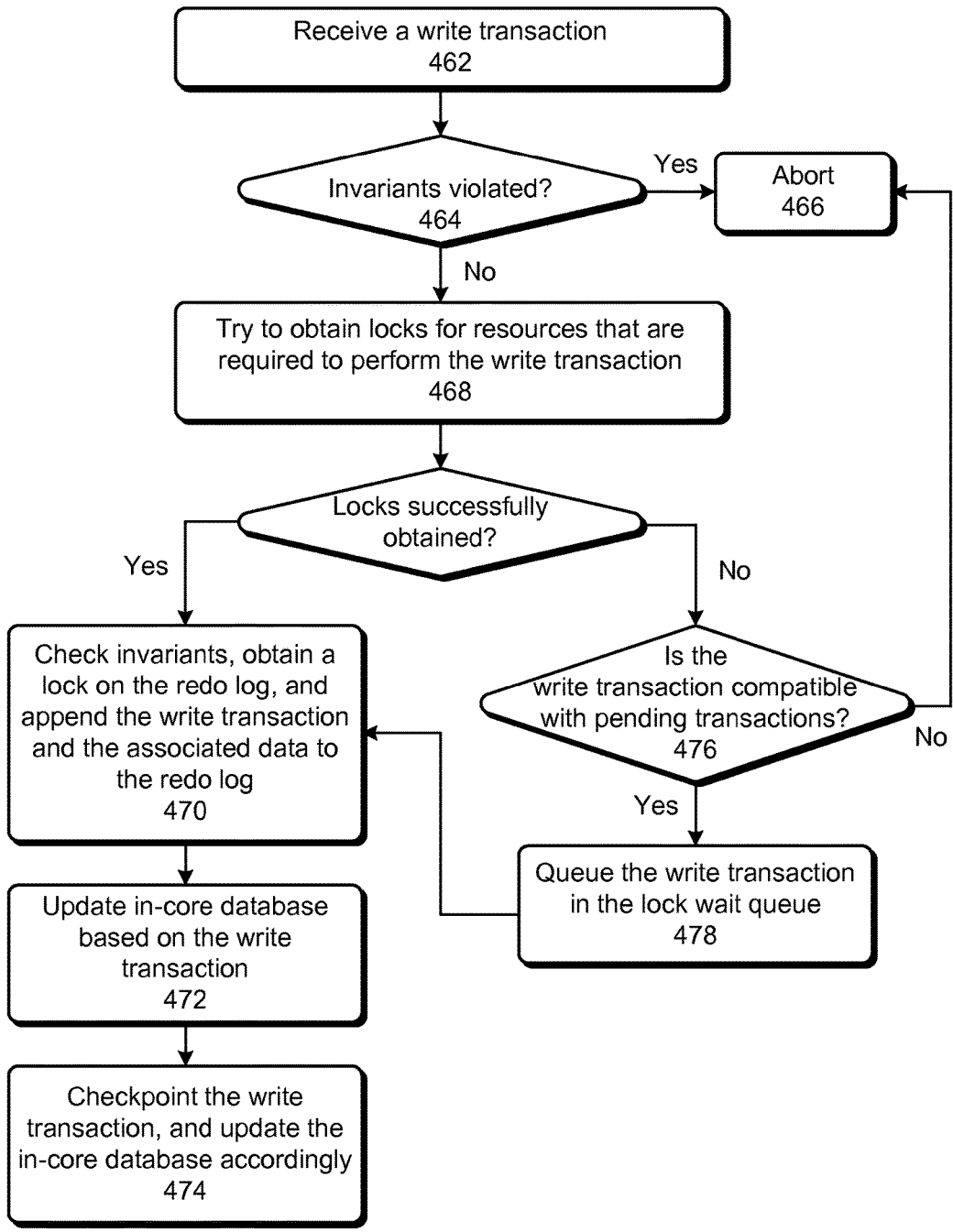
FIG. 4C presents a flowchart that illustrates a process for processing a write transaction in accordance with some embodiments described in this disclosure.

FIG. 4C presents a flowchart that illustrates a process for processing a write transaction in accordance with some embodiments described in this disclosure.

The process can begin by a database system receiving a write transaction (operation 462). Next, the database system can check whether any invariants are violated (operation 464). If so, the database system can abort the transaction (operation 466). If no invariants are being violated, then the database system can try to obtain locks for resources that are required to perform the write transaction (operation 468).

If the locks are not successfully obtained, then, for each resource for which a lock was not obtained, the database system can check if the write transaction is compatible with pending transactions (operation 476). If, for any of these resources, the write transaction is not compatible with the pending transactions, the database system can abort the write transaction (operation 466). On the other hand, if the write transaction is compatible with the pending transactions, then, for each resource on which a lock is desired to be obtained, the database system can queue the write transaction in the lock wait queue (operation 478).

Once the locks are successfully obtained, the database system can check invariants, obtain a lock on the redo log, and append the write transaction and associated data to the redo log (operation 470). Next, the database system can update the in-core database based on the write transaction (operation 472). Specifically, if the write transaction is for structured data, the database system can store the structured data in the in-core database. On the other hand, if the write transaction is for unstructured data, the database system can store a reference for the unstructured data in the in-core database. For example, the reference can be a pointer to the unstructured data in the redo log.

Once the in-core database has been updated, the database system can, via a background process or thread, checkpoint the write transaction, and update the in-core database accordingly (operation 474). Specifically, if the write transaction is for structured data, the database system may not need to update in the in-core database after checkpointing. However, if the write transaction is for unstructured data, the database system may need to update the reference in the unstructured data stored in the in-core database. For example, after checkpointing, the database system can modify the reference so that it points to the location of the unstructured data in the database file instead of pointing to the location of the unstructured data in the redo log.

In some embodiments, application-specific portable invariants can be defined and can be registered with a transaction. The database system can be unaware of the code inside the invariant. The database system can invoke (e.g., via a callback) the invariants at various stages during a transaction's lifecycle to decide if the invariants are still satisfied. If the invariants are not satisfied, the transaction can be aborted. In this manner, some embodiments can ensure database integrity without writing complex code. The aborter can test the invariant even before any locks are obtained by the transaction manager, thus ensuring that lock resources and time are not wasted on invalid or stale write transactions.

Unlike conventional database systems, in some embodiments, schemas can be made lock aware. This can offer directives to the transaction manager to obtain locks of appropriate granularity. A schema compiler can take advantage of the lock directives to tune the concurrency.

In some embodiments, the database system (e.g., database system 100 shown in FIG. 1) does not use a disk-based B-tree architecture that is used by many conventional database systems. Instead, some embodiments use an in-core database that stored database tables in physical memory. For many applications (and especially for version control applications), this approach provides substantially higher performance than conventional approaches.

Some embodiments described in this disclosure provide substantially high performance for situations where large binary data (media assets for instance) needs to be stored. Specifically, if data versions need to be kept instead of updating to the latest value, the multi-version concurrency control (MVCC) used in some embodiments always appends data into the tables on disk thereby avoiding disk seek penalties. However, unlike many MVCC systems that rely on read timestamps, some embodiments described herein do away with the need of book-keeping timestamps via the "dirty object" model and the use of invariants to abort transactions with stale data. Further, some embodiments can use two phase locking with the write transactions to isolate writes.

Embodiments described in this disclosure can generally be used in any system where a client needs to maintain state about the version of data it is currently using. Specifically, the client can pass the version information to the database system with a write transaction. A transaction manager can abort the transaction if the version number is not up to date. The version number could be a timestamp or an explicit number.

Version Control

Some embodiments described herein provide a DAM that supports VCS functions such as import, commit, check-out, update and list. These embodiments can also support additional functions such as add, move, rename, delete, resurrect, log, changeset listing, diff (difference between two files), merge, branch, publish, make-current, etc.

As explained above, some embodiments provide a database system that is implemented using an object oriented programming language. The database schema compiler can generate classes for each database from the supplied XML (Extensible Markup Language) schemas. In some embodiments, with the exception of the file data, all other metadata, namespace information, versioning information and various indices can be stored in databases.

In some embodiments, assets can be identified using an integer File Unique Identifier (FUID). All asset data revisions for each branch can be stored in a single file on the database server. This approach can be better than storing each data revision in a separate file as it does not burden the server file-system with the management of thousands of files. Each asset data revision in a branch can be appended to the asset file for the branch. In embodiments where all transactions including file data modifications are written to the redo log and redo transaction temporary data files, there are no problems if multiple concurrent transactions append to the same file. A checkpointer module in the database system can perform the task of appending each revision to the asset file at the time of redo log recovery.

The location of each revision's data in the asset file can be indexed in the File Index Map (FIM) database on the server. Specifically, the File Index Map can store a list of File Index Elements (FIE) for each asset and each branch containing file data modifications. For branches which do not contain any file data modifications for a particular asset, there is no necessity to have an asset file or a FIE list for that branch.

Each FIE can store the offset from the start of the asset file at which that revision's data starts. It can also store the length of the revision's data. In the case where the revision has not been check-pointed as yet (e.g., in case the revision's data has not been copied as yet from the redo transaction temporary file to the branch's asset file), the FIE can also store the name of the temporary file and the offset of the data in that file. Once a revision is check-pointed, these temporary entries can be removed. The FIE can store the Repository Revision Number (RRN) corresponding to the transaction in which this asset revision was created. The RRN can be an indication of the global number of revisions the entire repository has undergone. The asset's File Revision Number (FRN) (which can indicate the number of times the data in the file has been revised) may not need to be stored explicitly as it can be obtained directly from the number of elements in the FIE list prior to the FIE revision in question.

For each file data revision, the system can store the differences from the previous revision. These differences can be referred to as forward deltas. Storing forward deltas can substantially reduce the amount of storage required, especially in comparison with storing the entire file for each revision. The storage of all asset revisions of a branch in a single asset file can improve performance of the system.

The four basic types of namespace modifications that an asset can undergo are: addition, deletion, renaming, and moving. Resurrection of an asset after being deleted is also classified as an addition. The namespace of an asset is defined by the branch and the asset directory it resides in, along with, its name.

The namespace modifications to an asset can be encapsulated and stored in a Branch Manifest Entry (BME). A BME for an asset in a branch can encapsulate the name of the asset and the parent asset directory in which it resides. It can also store the RRN at which this modification was made and a Path Status variable which tells us the basic type of modification made. As and when namespace modifications are made, new BMEs can be created with the updated namespace state (asset name and parent asset) and appended to a BME list for that branch. Appending to a list enables maintaining namespace modification history. There exists a BME list for each branch, though the list may be empty if no namespace modifications have been made in the branch since its inception. This map of branch to its BME list is essentially stored in a database called the Branch Manifest.

In some embodiments, the system can assign every name string a unique integer Path Identifier (PID). This mapping of a name to PID is stored in the Path Name Table. Every BME stores the PID instead of the asset name string. This reduces storage requirements as an integer reference PID is on average much smaller than a character string name. Further, it removes the redundancy of different assets having the same name. If an asset is renamed, a new BME can be created for the asset with the PID of the new name. If the new name is already present in the Path Name Table, its existing PID can be used; otherwise, a new entry can be made in the Path Name Table with the new name and a new unique PID for it. The Path Status of the BME can also be set to "renamed."

Similarly, the FUID of the parent asset can be stored in a BME. If an asset is moved from one directory to another, a new BME can be created for it with the Parent FUID being that of the new directory. The Path Status of the BME can be set to "moved."

In some embodiments, the Changeset Table can store information associated with each transaction. Each Changeset Element in the Changeset Table can store information such as transaction comments, user who performed the transaction, branches affected by the transaction and the server timestamp of the transaction. The File Encoding Info Table can store information related to the encoding of each asset, such as whether it is a text file or binary, the kind of character set used if the asset is a text file, the file revision differencing format and the asset permissions that should be set when the asset is placed in a working copy.

In order to store meta-properties of assets, a system of databases can be used. The PropNameTable stores a unique integer identifier (PropID) for each meta-property name. The PropValueTable stores a unique integer identifier for each meta-property string value. Using the above two integer identifiers instead of strings for the name or value reduces the storage requirement because meta-properties for assets need to be stored per revision or per modification. The MetaPropTable can index an asset FUID to its meta-property name—value ID pairs at a particular RRN revision.

Other databases can be used for integrating the various features such as project management, workflow, publishing, thumbnail versioning etc. Specifically, in certain situations while working on a set of assets, a user may wish to lock those assets to prevent anyone else from making changes to them. In some embodiments, this can be accomplished through a Lock Table which stores the lock state of an asset. If an asset is locked by a user, an entry is made in the Lock Table with the asset and user ID in the locked state. When the asset lock is released by the user, an unlock entry is made in the Lock Table.

In some embodiments, small databases can be maintained on the client-side to manage the working copy of assets that is checked out from the database server. Some conventional VCSs store hidden directories in the working copy which store files holding meta-information about the assets, their version and the server repository. However, this litters the working copy and is especially irksome when packaging assets for distribution. These conventional VCSs offer commands that remove these VCS files and directories, but doing so delinks the working copy from the server repository and hence, the user cannot continue working in that copy and would require checking out a fresh working copy.

Some embodiments described herein provide a DAM system that keeps the working copy in a pristine condition. In these embodiments, no other spurious files in the asset's working copy are kept. The auxiliary databases to maintain the relationship of all working copies with their server repositories can be held in a central location, e.g., in a directory named ".zm" in the user's home directory. The databases for each working copy of the user can be stored in a separate directory within the ".zm" directory.

Some embodiments include a Repoid Map database that stores the linkage of the working copy path with its database directory in the central location, e.g., the ".zm" directory. Each entry for a working copy can also store additional information about the server repository of which the working copy is a part, such as project information, the server address and auxiliary database locations which store various server-related caches, such as workflow and thumbnail caches.

Some of the databases stored for each working copy can include the Working Copy Manifest, Path Name Table, Branch Name Table, File Encoding Info Table and copies of each asset file data for the revision present in the working copy, referred to as the "working copy base file." Additional databases such as Add table, Move Table, Rename Table, Delete Table and Resurrect Table can store namespace modifications to assets when they've been made in the working copy, but are yet to be committed to the server repository. Databases for conflict resolution, changelists and workflow can also be stored when required.

In some embodiments, the Working Copy Manifest (WCM) can contain a map of each asset FUID to its version-specific information, mostly a combination of what is stored in its BME and FIE in the server repository, such as, BID, Parent FUID, PID, RRN (Repository Revision Number), FRN (File Revision Number), file modification timestamp, etc. The Path Name Table (PNT) like its server counterpart, stores the mapping of asset names to Path IDs (PID). Similarly, the Branch Name Table (BNT) stores the mapping of branch names to Branch IDs (BID). The File Encoding Info Table stores the encoding information for each asset version in the working copy, such as, whether the asset is a binary file or text file, the character set used in the text file, the file differencing format used and the asset permissions as should be present on the working copy.

The working copy base file stored for each asset file can be a full copy of the file version's data. This copy can be useful for a user to compare and see the modifications made to the working copy file, help in resolving data conflicts when data modifications are received from the server, and reverting data modifications made by a user. This base file can also be useful in reducing server and network load because file differencing for committing new changes to the server can be performed on the client itself. The use of databases on the client-side too leads to great performance benefits as the databases can function in an append-only mode so that only the new modifications need to be written to disk, thus, speeding up commands.

Some embodiments include a number performance enhancing features. Specifically, all the assets in a transaction are written to a single transaction file and the various database updates and copy tasks are written to the redo log. Thus, during a transaction, major speed-up can be gained as only a single file needs to be written to and all the data is appended to the file. Time is not lost in accessing or creating individual asset files, or in multiple system calls made to open and close files. Only at the time of checkpointing (at server start-up or in a low priority thread) are the various asset contents copied into their respective individual files from the transaction file.

Further speed-up is achieved because no file locks need to be held while appending file data to the assets' individual files. This is performed only at checkpointing by a single thread. Transactions on the same asset in the same branch can concurrently write the file data to disk as each transaction writes the file data to a different redo transaction temporary file.

Another performance enhancing feature involves holding and updating the databases in physical memory (e.g., random access memory) while maintaining durability by writing all modifications to the redo log. Thus, reading databases is very fast, particularly in comparison to conventional databases in VCS, which read their databases from disk.

Another feature that improves performance is because the database design, database schemas, and resource locking schemas substantially reduces the amount of lock contention among write transactions. Further, read transactions do not need to obtain any locks due to the use of the "dirty object" mechanism and data structures that support concurrent operations.

Quite often in normal use of VCS, users request a file revision which differs by more than one revision from that which they have in their working copy or checkout an asset with many file revisions. Since, file data modifications are stored as file differences from the previous revision, multiple revisions' file differences need to be used together to jump from one file version to another. Thus, the feature of storing file revisions in one file for each branch enables opening the file once and reading as much data as is required in one go. Further, due to asset files being written during checkpointing, successive revisions are stored in order one after the other. This means a large chunk of data spanning successive revisions can be streamed in one shot. By storing separate files for each branch, there is no need to jump over data of revisions from other branches. This gives a major performance boost as hard disk drives perform well as a large chunk of contiguous data can be read in one pass, without requiring multiple time-consuming disk seeks.

Performance of the operating system is also improved as compared to storing separate files for each asset revision, as is done in many other VCS, e.g., those that use the RCS format. Having a large number of files slows down the file-system as the size of the file index tables explodes. Further, since file data revisions are stored as file differences, which tend to be fairly small in nature, in conventional VCSs, a large number of small files may end up wasting a lot of disk space with excessive internal fragmentation of disk storage. In contrast to conventional VCSs, embodiments described herein can store all of the revisions for one branch in a single file.

Some embodiments further improve performance by using multiple threads on a multi-core processor to concurrently perform tasks and transactions. On a database server, multiple transactions can proceed in parallel by executing in separate threads with minimal lock contention. Even on a client, multiple threads can be used so that while one thread is busy, say, reading data from a file, another thread could perform file differencing, and yet another thread could send data to the database server via a network. Additionally, some embodiments can use native file copying functions (e.g., "splice" on Linux) which copies a file directly to another file or to the network without reading it into memory.

In some embodiments, indexing in-memory databases is achieved using hash maps which guarantee O(1) time complexity for search and add operations. Part of the reason why some embodiments described in this disclosure can use a hash map based technique is that the database is held in memory and not accessed from disk. In contrast, conventional databases typically use slower and more complex schemes such as B+ trees.

Some embodiments can use a network compiler to optimally marshal data structures over the network. Holding a working copy base file on the client can improve server performance and network load, leading to faster commit command performance as file differencing can be performed on the client itself and only the difference in file data needs to be transferred. These performance enhancing features can be used in both the server and the client.

Data Compression

Some embodiments described herein provide a DAM system that is able to achieve very high data compression using adaptive file differencing. Data storage requirements for file revisions of any kind of asset is close to the amount of actual file data modified, not related to the number of revisions of the file. Some conventional techniques use file differencing for text files but stores full file revisions for binary files, which usually are larger.

Some embodiments described herein use an adaptive file differencing approach that allows for the use of a line-based delta format for text files which enables efficient display of annotations. For example, this approach can help determine which user performed which modification in a particular file revision. It can also improve the efficiency of operations which display differences between different asset revisions. File differencing for binary assets does not suffer in some embodiments described herein, since a binary differencing format such as VCDIFF is used for them.

The file differencing methodology used by some embodiments described herein can also adapt to available system resources. Large text asset's revisions can be encoded using the VCDIFF format instead of BDiff since BDiff requires reading the entire file into memory. Further the trade-off between performance and resources can be tuned by increasing or decreasing cache sizes for certain differencing techniques (e.g., XDelta3) depending on how much system memory can be used.

Some embodiments described in this disclosure provide methods and apparatuses for determining an inverse delta. These embodiments are particularly useful and efficient when at a particular time or location, only file A, and deltas d(A, B) and d(B, C) are available, whereas at another time or location, only file C is available.

In a conventional approach, file B can be constructed by first determining file A and delta d(A, B), and then apply d(A, B) to A. Unfortunately, this can require a lot of time and effort. Also, note that the conventional approach does not utilize the file C which is already available.

Note that if the inverse delta d(C, B) is generated, then that delta can be applied to the existing file C to get file B. In a conventional approach, the inverse delta d(C, B) can be generated as follows. First create the file B, by applying d(A, B) to file A, and then to create file C, by applying d(B, C) to file B. Now, the inverse delta, d(C, B), can be created by taking the difference of B from C. However, this approach requires the creation of two full files, B and C, and then taking the difference between them, requiring a lot of space and time.

In contrast to conventional approaches that are resource intensive, some embodiments described herein can generate the inverse delta, d(C, B), without creating any other files, and there is no requirement to explicitly take the difference between any two files, saving on both space and time.

Some embodiments described in this disclosure use reverse deltas instead of forward deltas. Storing reverse deltas helps in speeding up checkouts. However, reverse deltas may impose greater network load when updating a file to the latest version from a lower revision. Also, storing reverse deltas may means that the file differencing operation must be performed on the server, increasing server compute load and network load as the entire asset data must be transferred to the server. Even if file differencing is performed on the client and only the reverse delta is transmitted, a delta patching operation must be performed on the server to store the full latest file version.

Suppose files A, A1, A2, A3, . . . , Ak, B, B1, B2, B3, . . . , Bj, and C are different versions of a digital asset that were created in that order. Some embodiments provide methods and apparatuses for generating inverse delta d(C, B) based on the following inputs: file A and deltas d(A, A1), d(A1, A2), d(A2, A3), . . . , d(Ak, B), d(B, B1), d(B1, B2), d(B2, B3), . . . , d(Bj, C). Note that techniques for efficiently combining deltas (e.g., d(B, A) with d(A, C) to get d(B, C)) are known. In one variation, the system can create the delta d(B, C), given, the file A, deltas d(A, B) and d(A, C), without the creation of any intermediate files as follows: perform an inversion to create d(B, A) from file A and d(A, B), and then combine the deltas d(B, A) with d(A, C) to get d(B, C).

Deltas can be computed between every successive revision of a file. Some embodiments described in this disclosure use forward deltas, some embodiments use reverse deltas, and some embodiments use a combination of forward and reverse deltas.

The first version of a file is a full version. Whenever a full version is stored, the version is referred to as a base revision. After a certain number of revisions, say 100, the $101^{st}$ version may be stored as a full file for performance reasons. To obtain a file revision, the system identifies an appropriate base revision, and applies a series of delta patches from the base revision to obtain the desired revision. For example, assuming that the $101^{st}$ version is a base revision, then, to obtain the $103^{rd}$ revision, only the deltas corresponding to the $102^{nd}$ and $103^{rd}$ revisions need to be applied to the $101^{st}$ version. The base file interval (i.e., the number of revisions after which a base revision is created) can be a pre-determined number and/or can be computed based on the individual or cumulative delta sizes. Creating a base revision after each base file interval can place an upper bound on the amount of time and storage required to obtain any particular file version.

In some embodiments, to conserve computing resources on the server, a base copy of the file version present in the working copy can be stored on the client. When a user commits changes to a file, deltas can be computed on the client by taking the difference between the user modified file and the base file. However, for users who prefer not to store a base working copy of the file, delta computation can be performed on the server.

At the time of check-out or update of file from the repository to a client working copy, the requested version of the file can be created by applying the requisite deltas to the base file which is stored fully. Specifically, in some embodiments, the deltas can be first merged to create a combined delta, and then the combined delta can be applied to the base file. This approach can avoid creating complete files of all the intermediate revisions in order to create the required version. The server can adapt the delta patching approach based on the load. Specifically, the server can dynamically decide whether the delta patching is performed on the client or on the server. The server can also decide whether to send a single merged patch instead of multiple deltas.

In the case where forward deltas are stored and a client requests to update its file from a higher version to a lower revision, the server can use invert the delta to compute and send the inverted delta. This can be useful when there is limited network bandwidth as we can avoid sending the full base file and all the successive deltas. The technique for inverting a delta can also be used when a file revision is to be promoted to become the latest revision. Note that a file can be committed to be the latest version even if the client's working copy base file is not the latest revision.

Some embodiments of the delta inversion technique require the deltas to be in the Bdiff format. The Bdiff delta format encodes the difference between the source and target files as a series of "replacing fragments" called hunks. Each hunk gives the start and end points of the replaced data of the source file and the new data which replaces it. The replacing data is to be inserted instead of the data between the start point and end point in the source file.

Although the description of the inversion technique has been provided in the context of the Bdiff format, the technique can generally use any difference format. Many modifications and variations of the technique described herein will be apparent to those skilled in the art.

The technique requires that the hunks in the delta files are in increasing order of start position for replacement. If this is not the case, then a pre-processing step can be used to sort the list of hunks.

Once the hunks are properly arranged, the inverse delta d(C, B) can be created based on file A and deltas d(A, B) and d(B, C) as follows. For each hunk h_B in d(B, C), in order starting from the first hunk, the system can discard all hunks/portions of hunks of d(A, B) which lie before the start position of h_B with respect to positions in file A. Let h_BA be the hunk to be inserted in d(C, B). Then, the system can re-insert the data of A (which had been replaced by h_B in B) from the corresponding portions of file A and d(A, B). The system can then append hunk h_BA to d(C, B). The time complexity of this technique is O (m+n), where, m is the size of d(A, B) and n is the size of d(B, C).

Some variations of the above-described delta inversion process are as follows. In some embodiments, the inverse delta d(C, B) can be generated based on the file B and delta d(B, C). Note that this is a sub-problem of the general problem solved above and is solved by the above-described process by substituting file A by file B, and, substituting the delta d(A, B) by an empty delta file, i.e., by assuming that file A and file B are the same. Note that these delta inversion techniques are particularly useful to change file versions in the opposite direction of the delta storage direction used in VCS and DAM systems that use file differencing.

Figure 5A:
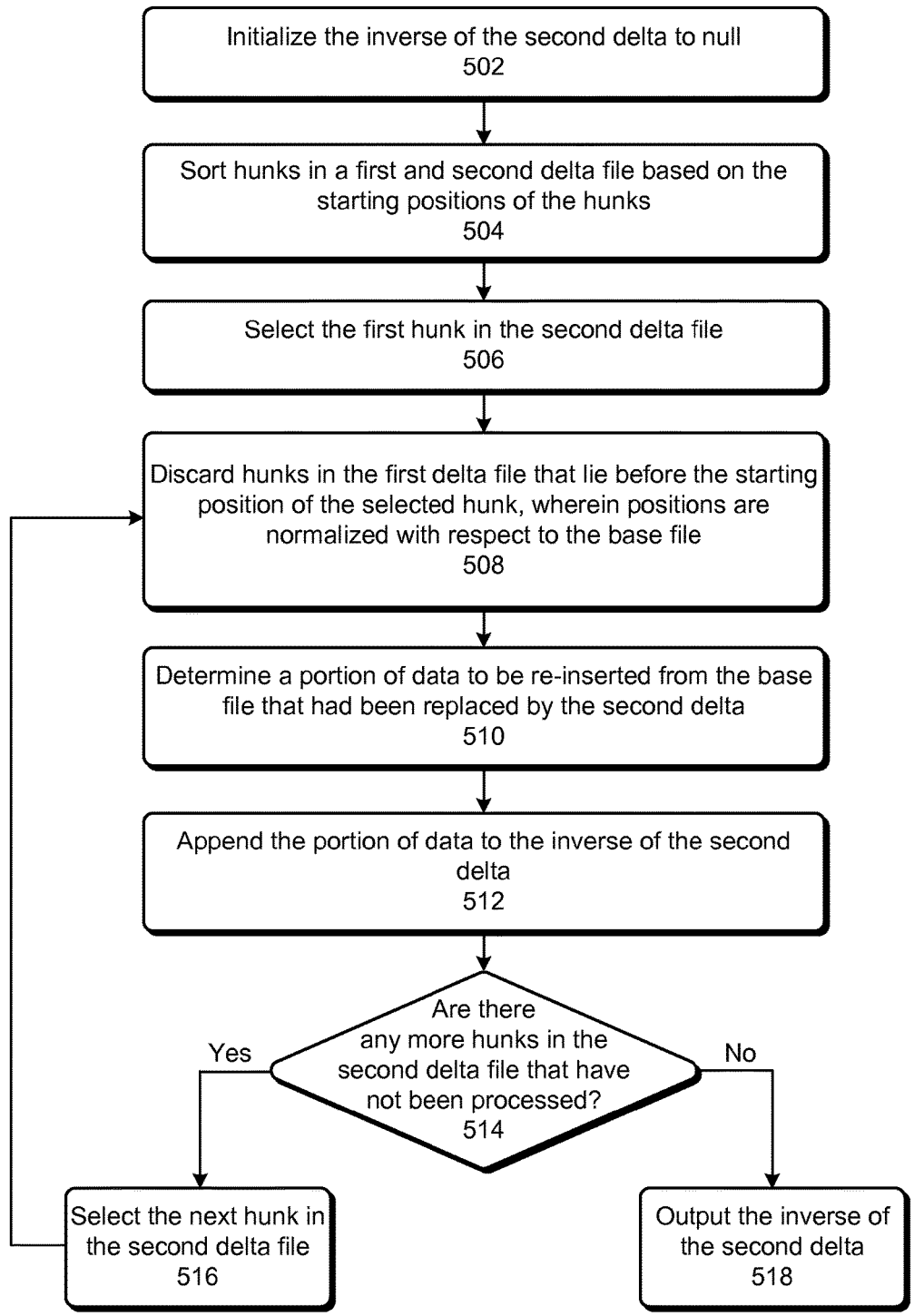
FIG. 5A presents a flowchart that illustrates a process for computing an inverse delta in accordance with some embodiments described in this disclosure.

FIG. 5A presents a flowchart that illustrates a process for computing an inverse delta in accordance with some embodiments described in this disclosure.

The inputs to the process illustrates in FIG. 5A can be the following: a base file (e.g., file A), a first delta (e.g., d(A, B)), and a second delta (e.g., d(B, C)). The output of the process illustrated in FIG. 5A can be the inverse of the second delta (e.g., d(C, B)).

The process can begin by the system initializing the inverse of the second delta to null (operation 502). Next, the system can sort hunks in a first and second delta file based on the starting positions of the hunks (operation 504). If the hunks are already in a sorted order, then operation 504 can be skipped. The system can then select the first hunk in the second delta file (operation 506). Next, the system can discard each hunk in the first delta file whose starting position is before the staring position of the selected hunk, wherein both positions are normalized with respect to the base file (operation 508). The system can then determine a portion of data by re-inserting data from the base file that had been replaced by the second delta (operation 510). Next, the system can append the portion of data to the inverse of the second delta (operation 512).

The system can then check if there are any more hunks in the second delta that have not been processed (operation 514). If there are more hunks that need to be processed, then the system can select the next hunk in the second delta file (operation 516), and return to operation 508. On the other hand, if there are no more hunks that need to be processed, then the system can output the inverse of the second delta (operation 518).

FIGS. 5B-5F present pseudo-code for a process for computing an inverse delta in accordance with some embodiments described in this disclosure.

Note that the filenames used in the pseudo-code are different from the filenames that were used in the inverse delta computation example shown above. Specifically, in the above-described inverse delta computation example, the filenames were A, B, and C. However, in the pseudo-code illustrated in FIGS. 5B-5F, the filenames are Base, A, and B. Filenames Base, A, and B in the above-described inverse delta computation example correspond to filenames A, B, and C, respectively, in the above-described inverse delta computation example.

The pseudo-code in FIG. 5B illustrates the high level flow, the pseudo-code in FIGS. 5C and 5D provides details of a discard function, and the pseudo-code in FIGS. 5E and 5F provides details of an insert function.

The notation used in the pseudo-code is as follows. Files Base, A, and B can be any three files. The notation "delta AB" denotes the forward delta to convert file A into file B. The goal of the pseudo-code is to obtain delta_BA, i.e., the backward delta to convert B to A, without creating any intermediate files or deltas. The pseudo-code takes three inputs: delta AB, Base (the full base file for file A), and delta_BaseA (the forward delta to convert file Base to A). The pseudo-code outputs delta_BA. The remaining terms used in the pseudo-code are self-explanatory.

Namespace Versioning

In some embodiments, to identify an asset we use a unique identifier, e.g., the FUID. This FUID is independent of the data contained in a file or the asset's full path name. Conceptually, this makes the full path name or the data stored in an asset only components of an asset. This is fundamentally different from an asset purely being defined by either its data or by its full path name. It also clearly establishes that an asset undergoes various changes to its data as well as its name and namespace, along with other meta-properties, such as read-write-execute permissions, content tags etc.

With respect to the namespace, we store entries for each namespace change to an asset. The data associated with the namespace are the name or a reference to the name of the asset, e.g., "alpha.txt", the parent directory (referred to by its FUID) in which the asset resides, and the branch or its reference in whose context the entire namespace is defined. We can denote such a namespace entry as a Branch Manifest Entry (BME).

Figure 6A:
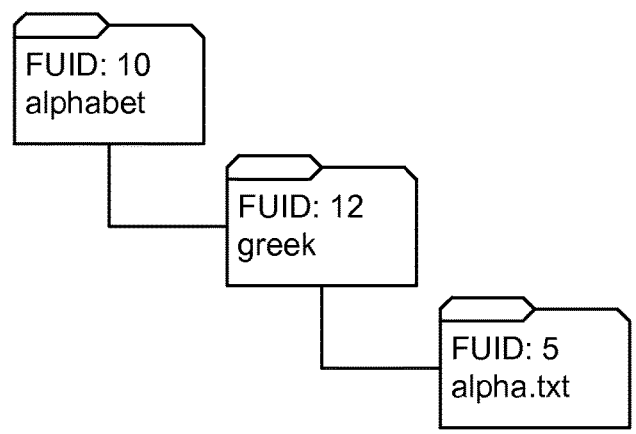
FIG. 6A illustrates how assets can be associated with file unique identifiers in accordance with some embodiments described in this disclosure.

FIG. 6A illustrates how assets can be associated with unique FUIDs in accordance with some embodiments described in this disclosure.

As shown in FIG. 6A, an asset file "alpha.txt" may reside in the directory path "/alphabet/greek/" in the repository, and can be assigned a FUID=5, which is guaranteed to be unique over the namespace. Each directory in the path is also assigned FUIDs. For example, as shown in FIG. 6A, "alphabet" could be assigned FUID=10, and "greek" could have FUID=12.

Figure 6B:
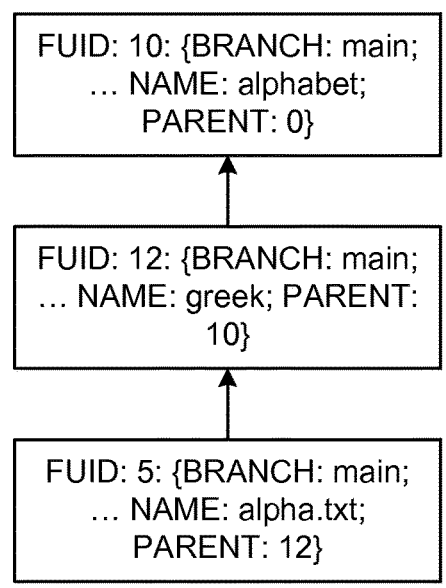
FIG. 6B illustrates how branch manifest entries can be used to represent the namespace of assets shown in FIG. 6A in accordance with some embodiments described in this disclosure.

FIG. 6B illustrates how BMEs can be used to represent the namespace of assets shown in FIG. 6A in accordance with some embodiments described in this disclosure.

The BME for the asset "alpha.txt" shown in FIG. 6A at least contains the name "alpha.txt" or a reference to this name denoted as the Path ID (PID), the parent directory "greek" or a reference to the directory through its FUID: 12, and the branch (shown as being equal to "main" in FIG. 6B) or a reference to it denoted as the Branch ID (BID). Note that the same asset file with FUID: 5, could have a different name and namespace in another branch. For example, the asset file with FUID: 5 could also appear in a branch called "private," with file name "smallAlpha.txt," and could reside in the directory path "/alphabet/smallGreek/".

Figure 6C:
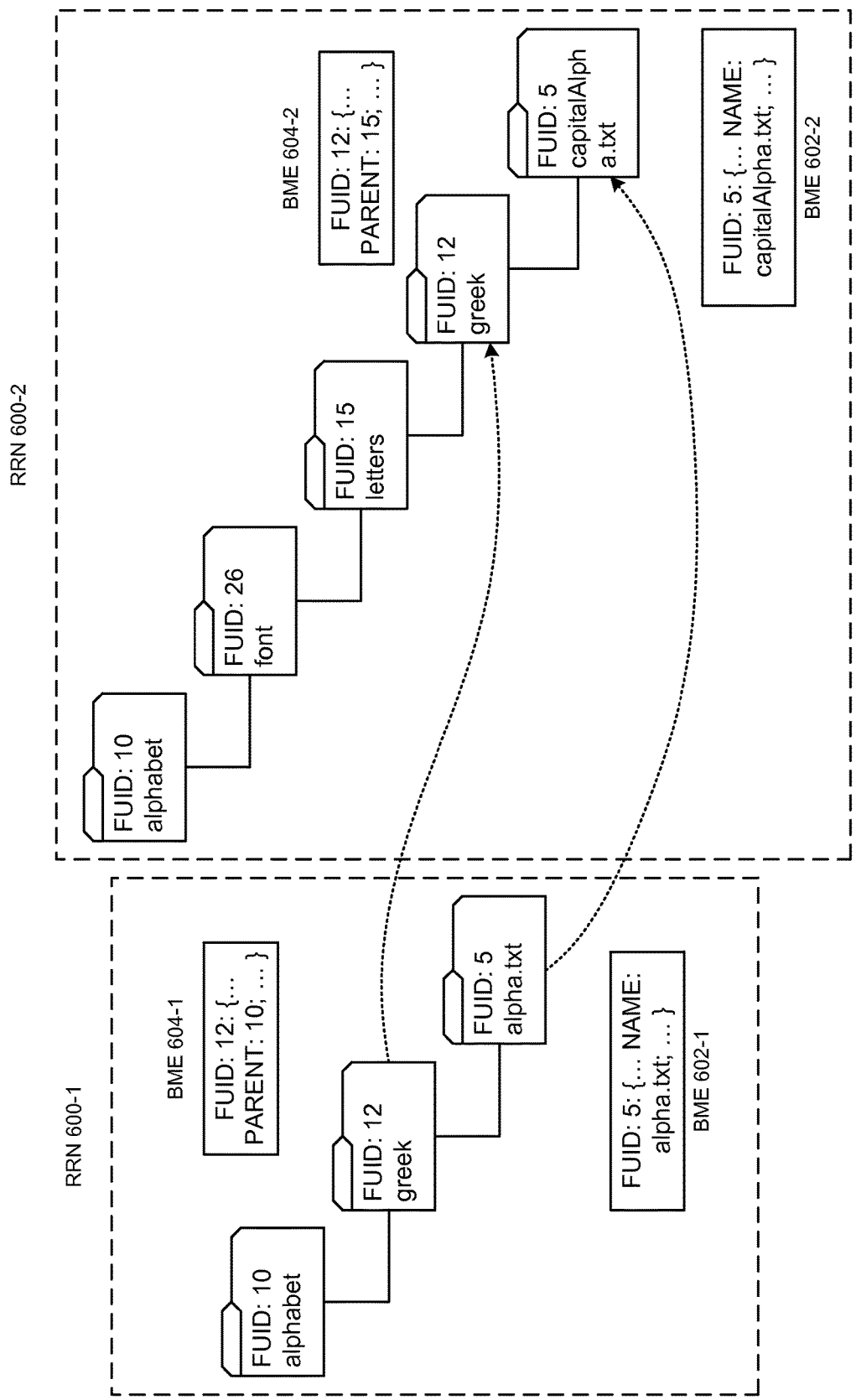
FIG. 6C illustrates how parameters of a branch manifest entry can be changed when a name or namespace change is performed on a digital asset in accordance with some embodiments described in this disclosure.

FIG. 6C illustrates how parameters of a BME can be changed when a name or namespace change is performed on a digital asset in accordance with some embodiments described in this disclosure.

When the system performs a name/namespace change to an asset, the system can create a new BME or modify an existing BME, with the new parameters. RRNs 600-1 and 600-2 are two different revisions. RRN 600-1 includes BMEs 602-1 and 604-1, which are associated with assets having FUIDs 5 and 12, respectively. RRN 600-2 includes BMEs 602-2 and 604-2, which are associated with assets having the same FUIDs, namely, 5 and 12, respectively.

When the asset associated with FUID 5 is renamed from "alpha.txt" to "capitalAlpha.txt," the system can create BME 602-2 for FUID 5 in RRN 600-2, wherein BME 602-2 stores "capitalAlpha.txt" or its PID instead of "alpha.txt". Similarly, if we were to move the directory "greek" with FUID 10 from its present directory "alphabet" (FUID 12) to another directory "letters" (FUID 15) at the path "/alphabets/fonts/letters/", then the system can modify BME 604-1 to obtain BME 604-2. Note that BME 604-2 contains the parent directory "letters" (FUID 15) instead of "alphabet" (FUID 12).

In this way all asset name and namespace changes can also be versioned, akin to versioning changes to file data, and the history of namespace changes. In other words, a user can choose to update or synchronize the working copy of the repository to any particular version of the repository and recreate, not just the file data at that time but also the names and namespace of the assets.

For working with the assets in a working copy, all assets must reside on a file-system under the control of an operating system. This imposes the natural restriction that each asset must have a unique name within its namespace. This is also achieved easily when applying namespace changes to assets in the repository, as we can always differentiate an asset from its name/namespace state and, thus, ensure that the namespace modification does not cause two assets within the same branch and namespace (i.e. directory) to have the same name.

Some embodiments provide methods and apparatuses to merge name/namespace changes between different repository revisions of assets and the personal working copy of a user, or, across different revisions of different branches in the repository.

In the discussion that follows, the working copy or the branch being merged is referred to as the "working copy," and the repository or branch being merged with is referred to as the "repository." The term "source state" denotes the common repository revision at which point the working copy and repositories were identical, and essentially, one is a copy of the other. The term "target state" denotes the repository revision with which to merge. With respect to the working copy, the term "source state" denotes the modified state of the working copy at the time of merging.

As each asset has a unique FUID, and we maintain BMEs which contain naming and namespace data for each FUID, we can always map the FUID to a file residing in the repository or working copy. Thus, file data changes can easily be applied from one file version to another. If there have been simultaneous file changes to both file versions, then in the case of text-files, their data can be merged, either automatically or with user-intervention. Otherwise, in the case of binary files, either one of the target states can be chosen to overwrite the other.

Simultaneous name/namespace changes in the two versions of the asset being merged can produce conflicts, which can be merged automatically or with user-intervention, or the changes in one version can be chosen over the other. However, name/namespace changes are different from file data changes, as they cannot be considered to be independent of name/namespace changes in other assets.

Let this namespace change graph, known as dependency graph, be denoted as DG(A, E), where A is the set of nodes/vertices in the graph and E is the set of edges or links between the nodes in the graph. Each asset is mapped to a node in the graph, thus, A is the set of assets in the graph. Next, an edge/link is created from one node, e.g., asset a1, to another node, e.g., asset a2, if performing the name/namespace change on a1 depends on the common source state or target states of a2 either in the repository or working copy. In the dependency graph, a2 can be an unversioned asset, i.e., a file which hasn't yet been saved to the repository and is present only in the local working copy of the user.

A disjoint connected component in a graph is a set of nodes, where, each node has at least one edge shared with another node in the set, and all the edges of the node are shared only with other nodes in the set. Once the dependency graph has been created, the system can partition the dependency graph into disjoint connected components. Each of the disjoint connected components can be referred to as a conflict set. Each conflict set is a set of assets not dependent on any asset in another conflict set.

Disjoint connected components can be computed by using find and union operations on a set. In general, any implementation of a set can be used. In some embodiments, the set implementation is based on union-by-rank and find with path compression techniques to improve performance.

In the dependency graph, the system can identify dependency chains or paths, e.g., a1→a2→a3→a4. Once a dependency path is identified, the system can start applying changes from the last node in the path (e.g., node a4 in the above example), and proceed backwards to the first node in the path (e.g., node a1 in the above example).

If a cycle is detected in the dependency graph, e.g., if a1→a2→a3→a1, then the system can create a temporary change state for any one of the assets. This will break the cycle and reduce it to a chain or path as described above. Once the changes are applied to the path, the system can restore the temporary state of the initial asset to the target state. Choosing the temporary change state can be done automatically or through user intervention.

In case there is a conflict, i.e., when user-intervention is required to choose between conflicting changes, and the changes cannot be applied immediately, we can shelve the conflict set containing the conflicted asset for resolution later. Meanwhile the system can apply the changes for the other unconflicted sets.

Figure 7A:
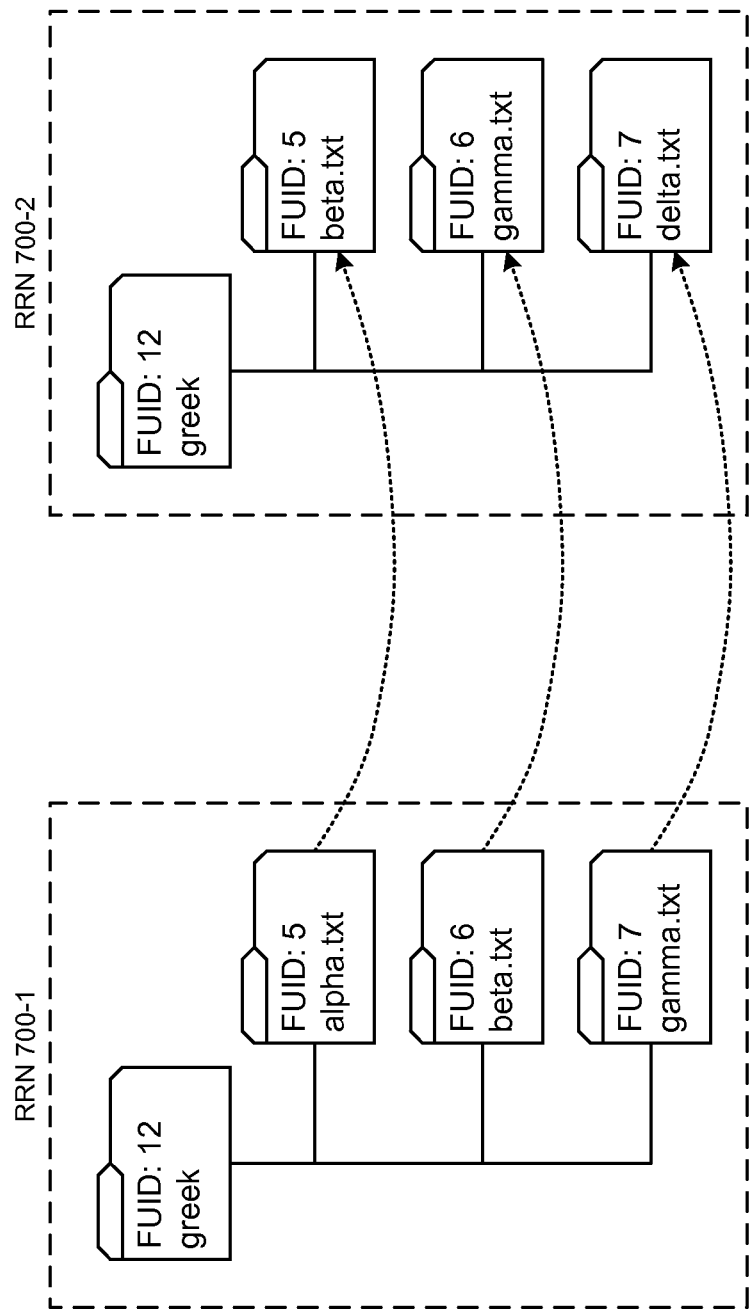
FIG. 7A illustrates an example of name and/or namespace changes in accordance with some embodiment described in this disclosure.

FIG. 7A illustrates an example of name and/or namespace changes in accordance with some embodiment described in this disclosure.

RRNs 700-1 and 700-2 correspond to two different revisions. Note that the filenames corresponding to FUIDs 5, 6, and 7 have been changed between RRNs 700-1 and 700-2. The name and/or namespace changes shown in FIG. 7A can be used to illustrate how the system can use a dependency graph based approach to apply the changes.

Asset a1 depends on asset a2 if performing the name/namespace change on a1 depends on the common source state or target states of a2 either in the repository or working copy. For example, in FIG. 7A, asset with FUID 5 depends on asset with FUID 6 because the name change of asset with FUID 5 from "alpha.txt" to "beta.txt" depends on the source state of the asset with FUID 6. Similarly, the asset with FUID 7 depends on the unversioned asset "delta.txt" in the working copy because the name change from "gamma.txt" to "delta.txt" clashes with the target state of the working copy.

A set of dependency use-cases can be defined, wherein each use-case identifies a situation where a dependency exists between two assets. These use-cases can then be used to generate a dependency graph.

An example of a list of use-cases which correspond to dependencies between two nodes in the dependency graph is described below. This list is being described for illustration purposes only, and is not intended to limit embodiments described herein. Specifically, many other use-cases may be defined, as will be apparent to those skilled in the art. While describing this list, an asset addition/rename/move/resurrection will all be referred to as a naming change, unless specified otherwise.

i. Asset FUID: f1 named on repository and target state name clash with source state of asset FUID: f2 on repository. Here, changes in FUID: f1 depend on FUID: f2.

ii. Asset FUID: f1 named on repository and target name clash with target name of asset FUID: f2 in working copy. Here, changes in FUID: f1 depend on FUID: f2.

iii. Asset FUID: f1 named on repository and target name clash with target name of unversioned asset a2 in working copy. Here, changes in FUID: f1 depend on a2.

iv. Asset FUID: f1 moved on repository from directory FUID: f2 to another directory FUID: f3, and, directory FUID: f2 being deleted on repository. Here, changes in FUID: f2 depend on FUID: f1.

v. Asset FUID: f1 moved on repository from directory FUID: f2 to another directory FUID: f3, and, directory FUID: f3 being deleted in working copy. Here, changes in FUID: f3 depend on FUID: f1.

vi. Asset FUID: f1 moved on repository from directory FUID: f2 to another directory FUID: f3, and, directory FUID: f4 being deleted in repository, while FUID: f4 is the parent directory of the target state of FUID: f1 in working copy. Here, changes in FUID: f4 depend on FUID: f1, in order for the user to resolve conflicts.

vii. Asset FUID: f1, as well as, its parent directory FUID: f2 deleted on repository. Here, FUID: f2 depends on FUID: f1. Here, FUID: f2 depends on FUID: f1.

viii. Asset FUID: f1, as well as, its parent directory FUID: f2 renamed/moved in repository. Here, FUID: f2 depends on FUID: f1.

Figure 7B:
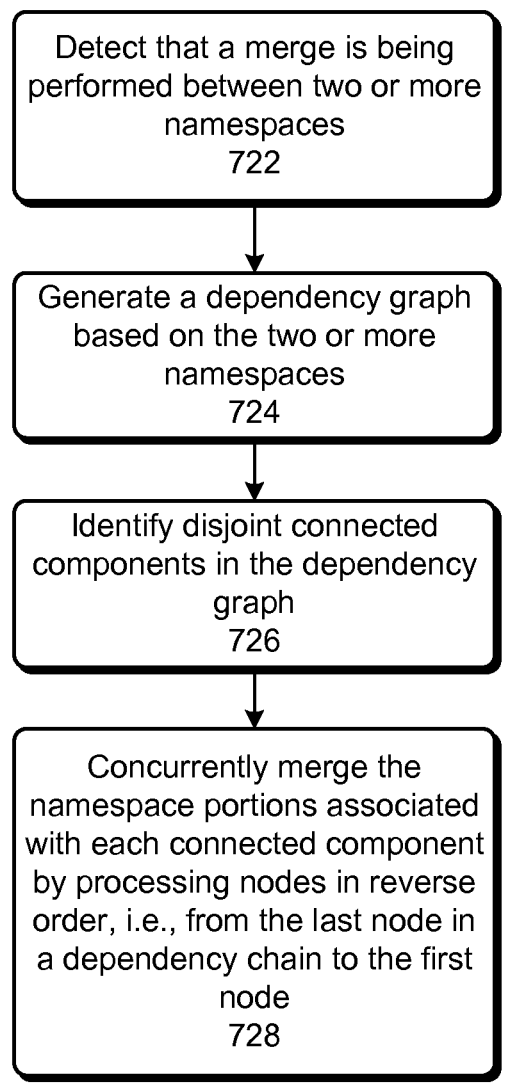
FIG. 7B presents a flowchart that illustrates a process for merging namespaces in accordance with some embodiments described in this disclosure.

FIG. 7B presents a flowchart that illustrates a process for merging namespaces in accordance with some embodiments described in this disclosure.

The process can begin by a system (e.g., a VCS) determining that a merge is being performed between two or more namespaces (operation 722). Next, the system can generate a dependency graph based on the two or more namespaces that are being merged (operation 724). As explained above, this operation may require the system to break any cycles in the dependency graph. The system can then identify disjoint connected components in the dependency graph (operation 726). Next, the system can concurrently merge the namespace portions associated with each connected component by processing nodes in reverse order, i.e., from the last node in a dependency chain to the first node (operation 728).

If any conflicts arise during merging, the system can either automatically resolve the conflicts based on a set of rules (e.g., default merge rules and/or user-defined merge rules) or prompt the user with a set of options to resolve the conflicts. Further details on identifying and resolving conflicts are provided below.

Conflicts can be classified into three major types: data conflicts, name conflicts and dependency conflicts. An asset's update could have all three kinds of conflicts. Conflict resolution refers to a process of choosing which change to apply from one or more conflicting changes.

Data conflicts occur when the target states for an asset in the working copy and the repository both contain file data modifications. For text files, an attempt can be made to automatically merge the data changes; however, this is not always possible. For binary files, automatic merging is usually not possible. Thus, user-intervention is required to resolve the conflicts.

Name conflicts occur when the target states for an asset in the working copy and the repository both contain name/namespace changes. For certain cases, such as a rename in one target change and a move in the other target, can be merged together. However, in most other cases, user intervention is required to choose one change over the other.

Dependency conflicts occur when an asset depends, as defined in the dependency graph, on another asset which is conflicted (data/name/dependency). Unless, the dependency target asset's conflicted state is resolved, we cannot apply changes for the dependent asset. Dependency conflicts due to partial merging can occur when an asset's target state clashes with the target state of another asset in the repository. This can happen only when all the assets in the respective conflict set of this asset are not all included in the scope of the merging operation. Otherwise, the namespace uniqueness invariant will always hold for the target state of the repository, and such a conflict cannot occur. Such a conflict can also be detected through dependency graph method and resolved by performing a merge which includes the entire scope of the conflict set.

For the purpose of conflict resolution, some embodiments store the following database tables containing conflict related information.

ConflictEntryTable: This table can store the mapping of the conflicted asset's FUID to its conflict entry which contains various metadata such as the type of conflict (data, name or dependency), flags to indicate whether a name or data conflict has been resolved, the type of action being performed on the asset during the update, and the asset(s) (FUIDs) that this asset's update depends on and whether they lay within the scope of the update.

ConflictSetTable: This table can store the mapping of each conflicted asset's FUID to the conflict set of assets to which it belongs. A conflict set of assets is stored as a set of their FUIDs.

ConflictedWorkingCopyManifest: This table can store the mapping of each conflicted asset's FUID to the target Working Copy Entry (WCE) that would be copied to the Working Copy Manifest (WCM) database once the asset's conflict has been resolved. Till the time conflict resolution is not complete, the previously existing WCE must remain in the WCM in order to: (1) allow identification of the assets in the working copy in their existing state, and, (2) provide differencing support between the existing and target states to aid in user's decision making, as well as, the application of the resolution action.

Base file data for existing and target revisions: The system can store the existing revision's working copy base file data so that the user can perform 3-way data merging in the case of data conflicts. Also, once the data conflict is resolved, the existing base file data is replaced by the target revision base file data in the client working copy's repository. In case there is no data conflict for a file, the existing base file data is replaced by the target file data directly at the time of the update.

For all FUIDs in a conflict set, the system can try to resolve their conflicts in the following order: (1) data conflicts and (2) dependency and namespace conflicts.

Data conflicts may be resolved first so that the system can free up space used by the existing base file data copy. Also, if data conflicts exist, it means that a user's working copy exists with local changes, and so, the final merged file can be saved at the existing user-copy path. As mentioned above, dependency conflicts and namespace conflicts are resolved in reverse direction of the dependency chain or path.

For each kind of conflict, different resolution actions can be performed. These choices of actions are presented to the user or internally aid in attempting auto-resolution. Most of these have been enumerated below. In the following discussion, "theirs" refers to choosing the modifications made on the server or target branch, and "mine" refers to choosing the modifications made by the user in the local working copy or the source branch.

Data conflict resolution actions: (1) theirs, (2) mine, (3) try auto-merge, (4) manual merge. Namespace conflict resolution actions: (1) theirs, (2) mine, (3) try auto-merge, and (4) manual merge.

For dependency conflict resolution, the system can traverse the dependency chain or path from the last node to the first node, and perform the following conflict resolution process:

I. if FUID is being deleted,
  A. If it depends on another FUID (e.g., FUID depends on FUID-D),
    1. if FUID-D is an ancestor directory, then the actions are:
      i. theirs (i.e. delete FUID);
      ii. mine (i.e. don't delete FUID);
    2. if FUID-D is in subtree,
      i. if FUID-D is being deleted, then the action are:
        a. first resolve FUID-D;
        b. mine;
      ii. else, the action are:
        a. update on FUID-D;
        b. mine
  B. else (i.e., it doesn't depend on any other FUID), then the action are:
    1. theirs (i.e., delete FUID);
    2. mine (i.e., don't delete FUID);

-continued

II. else, if FUID is being named,
  A. if it depends on another FUID (e.g., FUID depends on FUID-D),
    1. if FUID-D is an ancestor directory,
      i. if resolving FUID-D has not been tried, try resolving FUID-D,
      ii. else, the action are:
        a. theirs;
        b. mine;
    2. else,
      i. if FUID-D is part of an update,
        a. if resolving FUID-D has not been tried, try resolving FUID-D;
        b. else, the actions are:
          i. rename FUID (check for conflicts with new name);
          ii. mine;
      ii. else, the actions are:
        a. update on FUID-D;
        b. rename FUID (check for conflicts with new name);
        c. rename FUID-D (check new name);
        d. mine;
  B. else, assert that it depends on an unversioned/client-added file due to the existence of dependency conflict, and, in this case, the actions are:
    1. theirs (i.e., delete unversioned/client-added file);
    2. merge with unversioned/added file;
    3. rename FUID (check for conflicts with new name);
    4. rename unversioned/added file (check new name);
    5. mine (for move/rename) or delete the FUID (for added file).

The system can also provide an "apply to all" action. This option can be exercised by the user to apply a resolution action (possibly only mine and theirs) which has been applied to a FUID, to all the conflicts in that conflict set. In the use case in which (1) server-deletion of a directory and its subtree which has been dependency conflicted due to certain conflicted FUIDs in the subtree, and (2) "mine" action has been applied to a conflicted server-deleted FUID, i.e., the FUID is not to be deleted on client, the system can perform the following actions if "apply to all" is the selected strategy: "mine" action to be applied to all the server-deleted ancestors in the FUID's path, i.e., the path must be maintained undeleted on client.

Branching Support

In some embodiments, branches are uniquely identified by their Branch ID (BID). The association of the branch name with its BID is stored in the Branch Name Table (BNT). This BID can be an integer. Integer comparisons are quicker than string comparisons and integers also require lesser storage space, especially since it needs to be stored in several databases. Also, assigning a BID enables easy renaming of branches. The Branch History Table (BHT) stores the history of when a new branch is forked from an existing branch and when one branch is merged with another branch along with the repository revision at which these changes took place.

In some embodiments, only asset modifications are associated with branches, not the asset itself. Each modification made to an asset is saved within a branch. Also, every modification is associated with one and only one branch. Such a method of branching ensures that there is optimum use of storage space as entire assets are not replicated with every branch. Thus, a BID is associated with each namespace modification entry, i.e., Branch Manifest Entry (BME), and with each file data modification entry, i.e., File Index Element (FIE). To reduce redundant storage of BID with each entry, the database schema is organized such that a map is stored with the BID (key) to a list of BMEs and another map with the BID to a list of FIEs.

In some embodiments, when a new branch is forked from an existing branch, a copy of all the source branch's assets is not made. The initial entries are created for the new branch in the Branch Name Table and the Branch History Table. For the purpose of better performance, a copy can be created of the most recent namespace entry, i.e., Branch Manifest Entry (BME), of all the assets in the source branch, with the new branch's BID in the Branch Manifest (BM) database. This is not essential as the BHT entry for the branch can always be used to obtain all the assets present in the branch.

Project Management Support

In some embodiments, projects are treated as first-class entities. This makes project management tightly integrated with VCS features. The project properties are stored in the Project Map table, which maps the project name to its properties data structure. The database schemas associate assets and branches with a project. This association is also stored in the Project Map table.

There are several advantages of treating projects as first-class entities. Firstly, assets in a given project are better organized. Project level security and access permissions can be implemented to prevent misuse of assets or errors. A user for instance who is authorized to administrate a particular project, may be given only viewing authority for another project. Also, different users can be assigned to be project administrators in order spare the super administrators from day-to-day management of the project.

All assets inside the sub-tree of a designated project directory can be part of the project. Also, in some embodiments, project assets are exclusive to it. Thus, assets can be easily associated with a project by assigning the project directory. It is ensured that no project directory has an ancestor directory which is the project directory for another project.

Some embodiments can support the notion of users having different roles in a project. For instance, in an animation movie project, users could be classified by their different roles such as sketch artists, coloring artists, 3D modelers, animation experts, voice-over artists, and different levels of managers. Even within one organization, each project can have different user roles. For instance, the same animation company may be having another project involving computer software developers, computer graphics scientists, and quality inspectors.

Some embodiments provide functionality for project administrators to create project-specific roles and assign the various team-members to their different roles. One or more tables can be used on the server to store the roles and their properties and the assignment of users to the different roles. This provides another level of granularity for various DAM aspects such as security, access control, workflow etc. easing the task of project management. For instance, in the above example, the users who are assigned to be computer software developers can be allowed to perform modifications to assets, while quality inspectors need to be allowed only read access to assets, as they should not be modifying the software.

Integrated Workflow Management

Some embodiments allow projects and users to be created within the VCS. Each user can also be mapped to a role defined by the user organization, such as 'developer', 'designer' etc. Thus, access to assets and tasks can be controlled at different levels of granularity—project-level, asset-level, role-level, or, user-level. Further, tasks can be assigned not just at the level of users, but also to roles, so that any person in a given role can perform the task.

In some embodiments, once workflow has been finalized and tasks are created, then the owner of the first task of the workflow can be informed. The user can start the task by sign-in, which will automatically trigger the check-out of the task's related work and help files to a user specified location. As tasks are completed, the owner of the subsequent task in the workflow can be notified to start their work. The assignee of a task also has the flexibility of not accepting the task, in which case, a new assignee needs to be allotted for the task.

In some embodiments, common VCS commands like checkout, commit, update, etc. can support the task notion. In these embodiments, there is no need to switch views or learn multiple interfaces or commands for using workflow and VCS features.

With auto workflow, a user does not need to worry about the task sign-off process. The repository server tracks committed files and signs-off the task automatically if all the assigned work files have been committed. Also, the asset locking mechanism in the VCS can be triggered to automatically lock and unlock assets at the start and end of a task, respectively.

In some workflows, a review can be used to judge a user's work. If a reviewer rejects the work of a user on a task, then it has to be redone. Only if the work is approved can the next task in the workflow be available for sign-in. The following terms are used in the discussion below. Assignment task refers to a task in which one has to do some work like code or multimedia content development, etc. Approver's task or Review task refers to the task in which approver(s) have to approve or reject the assignment task. In other words, an approver has to review the work which has been done under assignment task. Tn refers to assignment task n. Rn refers to approver's task or review task n. A review task may contain one or more approvers and may use different review policies, which will be covered later. The following table illustrates an assignment-review workflow.

| Task Type | Due date | Note |
| --- | --- | --- |
| T1 | $10^{th}$ Jan. 2008 | Assignment task T1 starts on $5^{th}$ Jan. |
| R1 | $12^{th}$ Jan. 2008 | Review task; approver(s) has to review T1 |
| T2 | $15^{th}$ Jan. 2008 | Assignment task with out any review required |
| T3 | $18^{th}$ Jan. 2008 | Assignment task |
| R2 | $20^{th}$ Jan. 2008 | Review task; approver(s) has to review T3. |
| R3 | $22^{nd}$ Jan. 2008 | Review task; approver(s) has to review T3. (May be used as hierarchical review). |

Combining workflow and VCS functionalities can allow for new and useful review policies. For example, review policy "any" can refer to a policy in which one or more task approvers can review a task. If any one of them approves, it means the task is approved. Review policy "all" can refer to a policy in which the task is approved only if all reviewers approve the task. Review policy "majority" can refer to a policy in which the task is approved if a majority of the reviewers approve the task. If more than one reviewers have been specified, then approval (review) can occur concurrently. Concurrent approval can be faster than sequential approval.

A user can devise any sequential or hierarchical review structure in the workflow scheme. For example, in the above table, review task R2 and R3 are sequential review task because before completing R2, R3 will not be able to start. This sequential review can also be transformed into a hierarchical review if R2 and R3 approvers are at different hierarchy levels with respect to their designations or roles. For example, R2 approvers could be "developers" and R3 approvers could be "managers".

In some embodiments, objects (e.g., assets) can be tagged, and the tags can be used in both the CVS and the workflow tools. Tagging is not only limited to the "publish" tag, and one can define rules for giving tags to assets. This can happen at either task sign off or commit. Because workflow and VCS are integrated, workflow can easily access assets and assign tags to them, which can be very difficult and potentially unsafe if VCS and workflow tools are different. VCS and workflow commands can provide features to operate on tags. For example, the VCS command "list or ls" can list files and directory with a given tag or one can checkout specified tag related files for packaging.

Each work flow and work task can be identified by a unique ID known as the WorkId, similar to the FUID used for identifying assets. Some embodiments use various server-side databases to integrate workflow and VCS. These database can include the following: WorkflowTable, WorkTable, WorkTracker, WorkToFuidsTable, WorkToHelpFuidsTable, WorkProgressTable, and ReviewStatusTable. These databases are described below.

WorkflowTable: This table stores the mapping of WorkId to its workflow properties such as its name, project, user who created it, creation time, modification time, etc. Along with these properties are stored links, by way of WorkIds, to the first work tasks in the workflow.

WorkTable: This table stores the mapping of WorkId to its work task item's properties such as its name, description, user who created it, due date or duration, modification time, etc. Further, along with these properties, the list or graph of tasks in a workflow is maintained by storing with each WorkId, the lists of the just previous and the just next tasks, referred to by their WorkIds, to the given task in the workflow. The table stores both kinds of tasks—assignment and approval. Assignment tasks have the additional property of the user to whom the work has been assigned to, whereas, approval tasks contain the additional information of the set of users or role to whom the review has been assigned to.

WorkTracker: This database table stores the mapping of each task WorkId to a set of the various repository changesets, by way of their Repository Revision Numbers (RRN), which contain all sorts of operations performed in the process of completing the task.

WorkToFuidsTable: This table contains the mapping of each assignment task WorkId to the set of assets that have been assigned to it. The assets are referred to by their FUIDs. These assets are the ones which are or are meant to be worked upon as part of the completion of the task.

WorkToHelpFuidsTable: This table contains the mapping of each assignment task WorkId to the set of help assets that have been assigned to it. The assets are referred to by their FUIDs. These assets are the ones which are only provided for reference and are not worked upon as part of the completion of the task.

WorkProgressTable: This table tracks each work owner's individual progress. It maps the WorkId to an owner progress sub-table. The owner progress table maps each worker's id to their work progress list. The work progress list contains WorkProgress entries. Each Workprogress entry describes the modification time, comment if any for the work step, work status (not-started, started, finished, approved, rejected, refused, review-pending, overdue, due) and a phase number (indicates the attempted round number for work that was rejected during review). Since our solution supports multiple attempts to get work finished if rejected by approvers, work progress needs to track each phase as the owner tries to finish the assigned work.

ReviewStatusTable: This table contains the mapping of review task WorkId to a mapping of assets associated with the task and the list of comments and review decisions given to the work done in the asset. Work progress table tracks work owner's individual progress. ReviewStatusTable tracks individual file or FUID's status with respect to comments by reviewer. A reviewer when he/she is done with entire review will still update the work progress table.

In some embodiments, the following databases can be stored on the client: Fuid2Workid and Task2WCMap. These databases are described below.

Fuid2Workid: This table tracks for a given asset/file if it is associated with a task or workid. To ensure a given file can be modified by only a single task at a time by any user, these files are also locked on the server. During a commit by the user on their working copy, this table is consulted to determine what files are part of a work assignment. Such files are then updated by the workflow module on the server in the work progress table.

Task2WCMap: This table maps a given WorkId to a working copy path. The workflow browser uses it to determine where on the working copy the user has checked out the files associated with a given task. This allows tasks to be signed-off and auto-committed from the workflow browser itself.

Workflows and tasks can be created and modified using an integrated user interface. For example, workflow fields' values are submitted via browser to the server; correspondingly entries are made in Workflow Table. Workflow table has a field which points to the very first Work ID under that workflow, this fields helps us to reach the task/work under that workflow.

Figure 8:
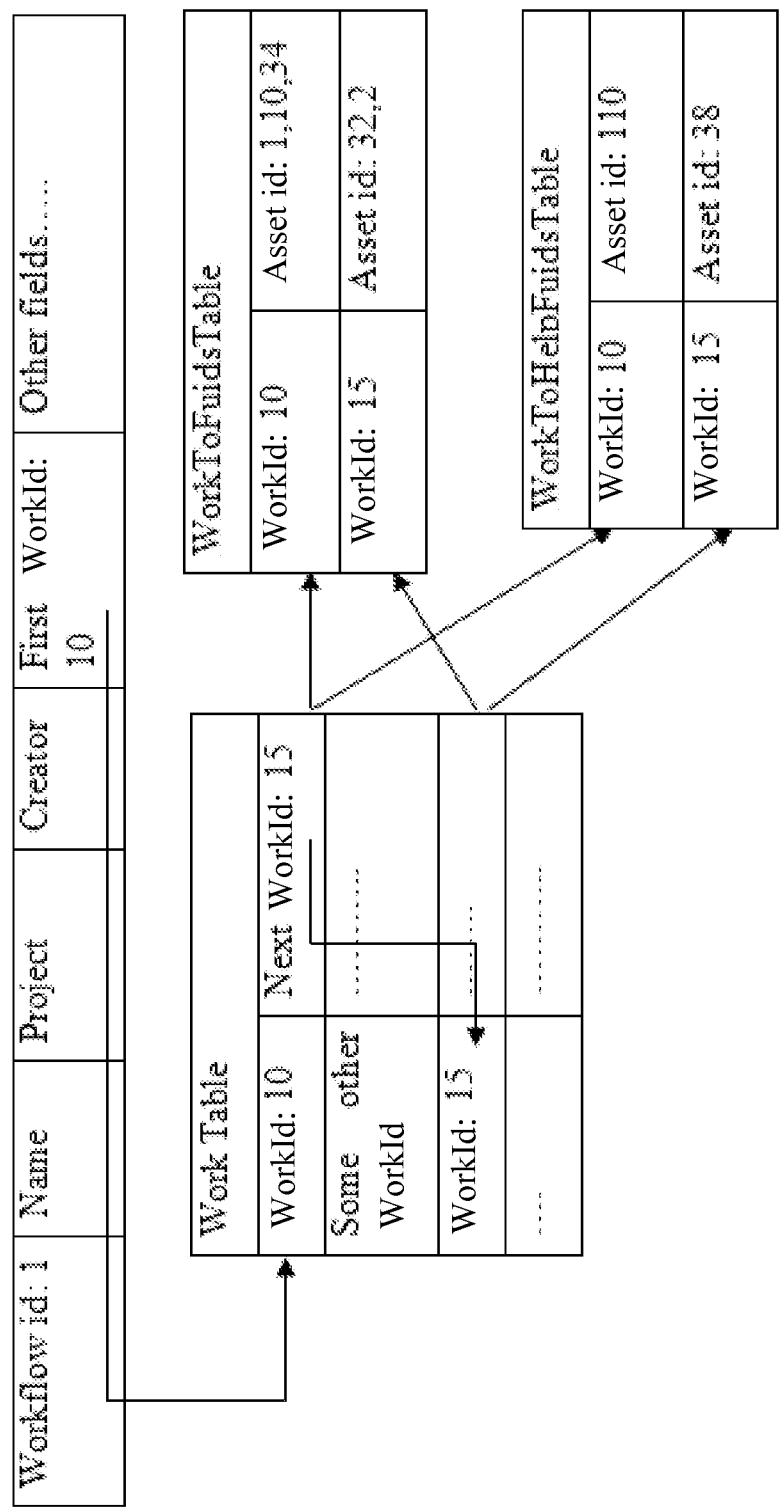
FIG. 8 illustrates an example of a workflow and workflow table linkages in accordance with some embodiments described in this disclosure.

FIG. 8 illustrates an example of a workflow and workflow table linkages in accordance with some embodiments described in this disclosure.

Tasks with their work details can be stored in the WorkTable. For the first task a pointer to it can be stored in the Workflow Table. WorkTable is collection of all workids to work detail records, where each work is either assignment work or an approval, each work tuple also points to next work for its respective workflow. If work or help files are assigned to work, then theirs entries are added to WorkToFuidsTable and WorkToHelpFuidsTable. For example, as shown in FIG. 8, a workflow with workflow id=1 indicates that the first task has work id=10. The WorkTable then indicates that the task after the first task has work id=15. In this manner, the system can move from one task to the next in the workflow. Further, as shown in FIG. 8, for each task, the tables can identify the assets (e.g., FUIDs) that are used in each task.

Task checkout is exactly like file or directory checkout, instead of specifying file or directory path one has to give task id. Once server has received taskid/workid from the client it validates it. Work associated file ids (asset ids) can be obtained from WorkToFuidsTable and WorkToHelpFuidsTable. After processing work and help files (processing includes preparing them for checkout) the system can create an entry in WorkProgressTable. For example, the system may create the following entry:

| Work Id | Owner | Mtime | WorkStatus | Phase | Other details |
|---|---|---|---|---|---|
| T1 | Owner name | 1 Jun. 2010 | Started | 0 | Other details . . . |

In the above table, the Phase field is used only when a task has been rejected. If rejected, the task has to be redone; in that case the Phase field value is incremented by one and results in triggering a restart of task. For example, the table shown below illustrates this (T1 is an assignment task in the example shown below).

| Task Id | Owner | Mtime | WorkStatus | Phase | Other details . . . |
|---|---|---|---|---|---|
| T1 | Xyz | 1 Jun. 2010 | Started | 0 | Other details . . . |
| T1 | Xyz | 3 Jun. 2010 | Review Pending | 0 | Other details . . . |
| T1 | Xyz | 4 Jun. 2010 | Rejected | 0 | Other details . . . |
| T1 | Xyz | 5 Jun. 2010 | Started | 1 | Other details . . . |

A table for the approval task R1 that corresponds to assignment task T1 is shown below.

| Task Id | Owner | Mtime | WorkStatus | Phase | Other details . . . |
|---|---|---|---|---|---|
| R1 | Abc | 3 Jun. 2010 | Started | 0 | Other details . . . |
| R1 | Abc | 4 Jun. 2010 | Rejected | 0 | Other details . . . |

In these examples, the Phase value corresponds to how many times the task has been rejected or how many attempts have been made to finish it, a useful measure of a user's performance. Once a task has been started, no other user is allowed to commit task files expect the task owner. To achieve this, work files are locked on the server.

Figure 9:
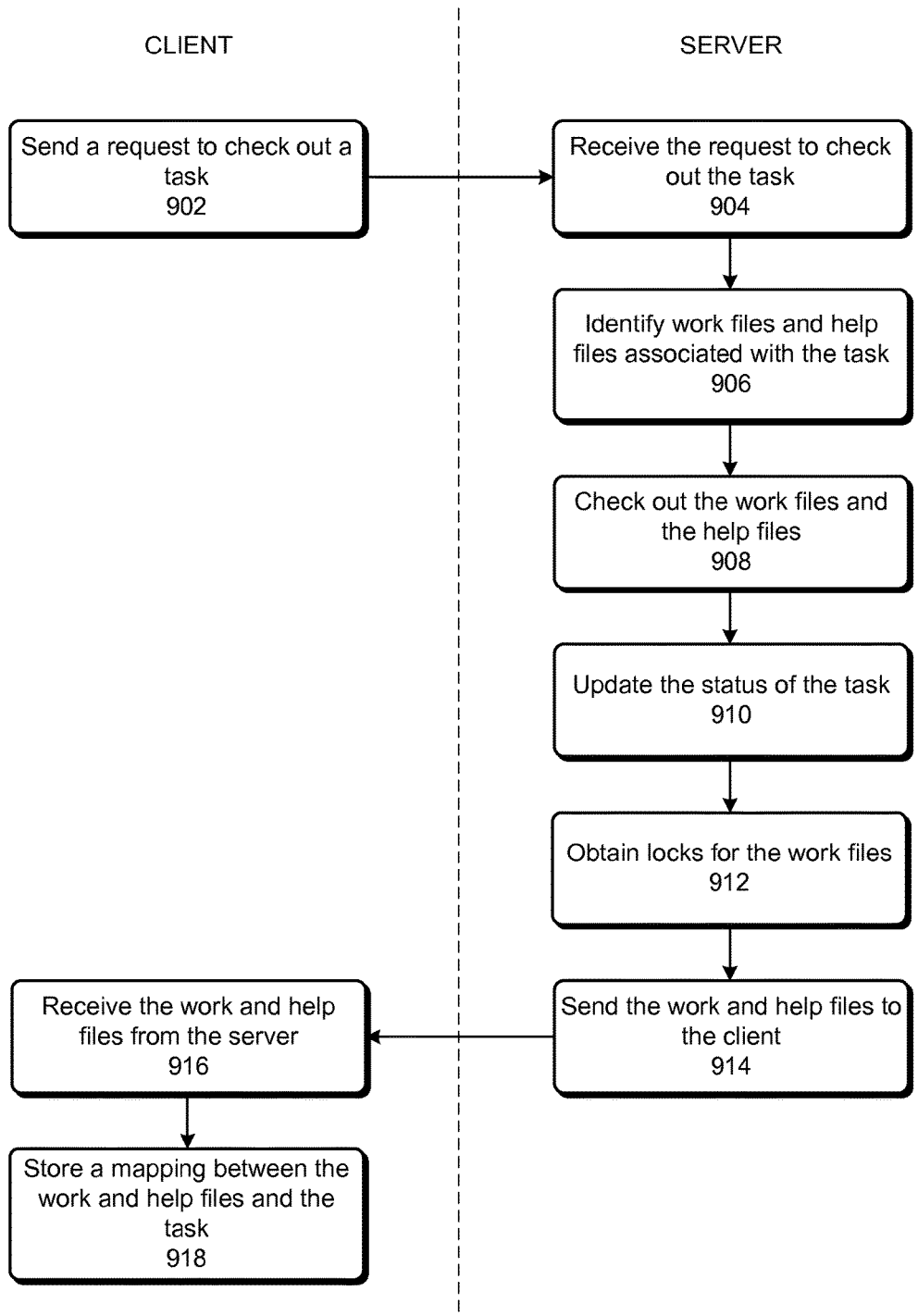
FIG. 9 presents a flowchart that illustrates a task checkout flow in accordance with some embodiments described in this disclosure.

FIG. 9 presents a flowchart that illustrates a task checkout flow in accordance with some embodiments described in this disclosure.

The process can begin by a client sending a request to a server to checkout a task (operation 902). Next, the server can receive the request to check out the task (operation 904). The server can then identify work files and help files associated with the task (operation 906). For example, the server may use the WorkToFuidsTable and WorkToHelpFuidsTable to identify the files. Next, the server can check out the work files and the help files (operation 908). The server can then update the status of the task (operation 910). For example, the server can create an entry in the WorkProgressTable for the task. Next, the server can obtain locks for the work files (operation 912). Obtaining the locks ensures that only the user who is performing the task is allowed to commit any changes to the work files. Next, the server can send the work and help files to the client (operation 914). Next, the client can then receive the work and help file from the server (operation 916). The client can then store a mapping between the work and help files and the task (operation 918). For example, the client can use the Fuid2Workid table to store this mapping.

In some embodiments, once a user issues a commit on the working copy, the client sends the files to be committed with the associated task identifiers if present (a commit may include normal files plus task related files). For example, client may send three files: F1, F2, and F3, wherein F1 and F3 may be associated with task T1, and file F2 may not be associated with any task. The client can obtain this information (i.e., the mapping between files and tasks) from the Fuid2WorkId table.

Once the server receives the commit request, it can sort the task files and non-task file separately. For the files that are associated with task identifiers, each unique task id can be validated (validation may include owner check, task expiration check, etc.). If an invalid task is found then user can be alerted and the commit operation for the associated tasks can be aborted.

For task files and non-task files normal commit procedure will apply, during a normal commit we automatically generate a unique RRN (Repository revision number or Changeset number) for this change. The server can use this RRN to update WorkTracker table. For a given task, multiple RRNs may be stored. For example, if a user commits task files thrice and each commit generates an RRN, e.g., {RRN: 12, RRN: 13, RRN: 32}, the entry in the work tracker table may be as follows:

| Work Id | WorkRRNSet |
|---|---|
| T1 | 12, 13, 32 |

If it is an auto workflow and all the task files are committed at least once (including this commit) then the task sign-off procedure will be triggered (task sign-off means the task is finished, though not approved yet). This will mark the task as completed and in the commit response received by the DAM client, Fuid2WorkId table will be cleaned. Specifically, in some embodiments, an entry can be made in WorkProgressTable as shown below:

| Task Id | Owner | Mtime | WorkStatus | Phase | Other details . . . |
|---|---|---|---|---|---|
| T1 | Xyz | 6 Jun. 2010 | Review Pending. | 1 | Other details . . . |

After this, further checkouts and commits on this will not be allowed (except if the task is followed by an approval task and approver rejects the work).

Figure 10:
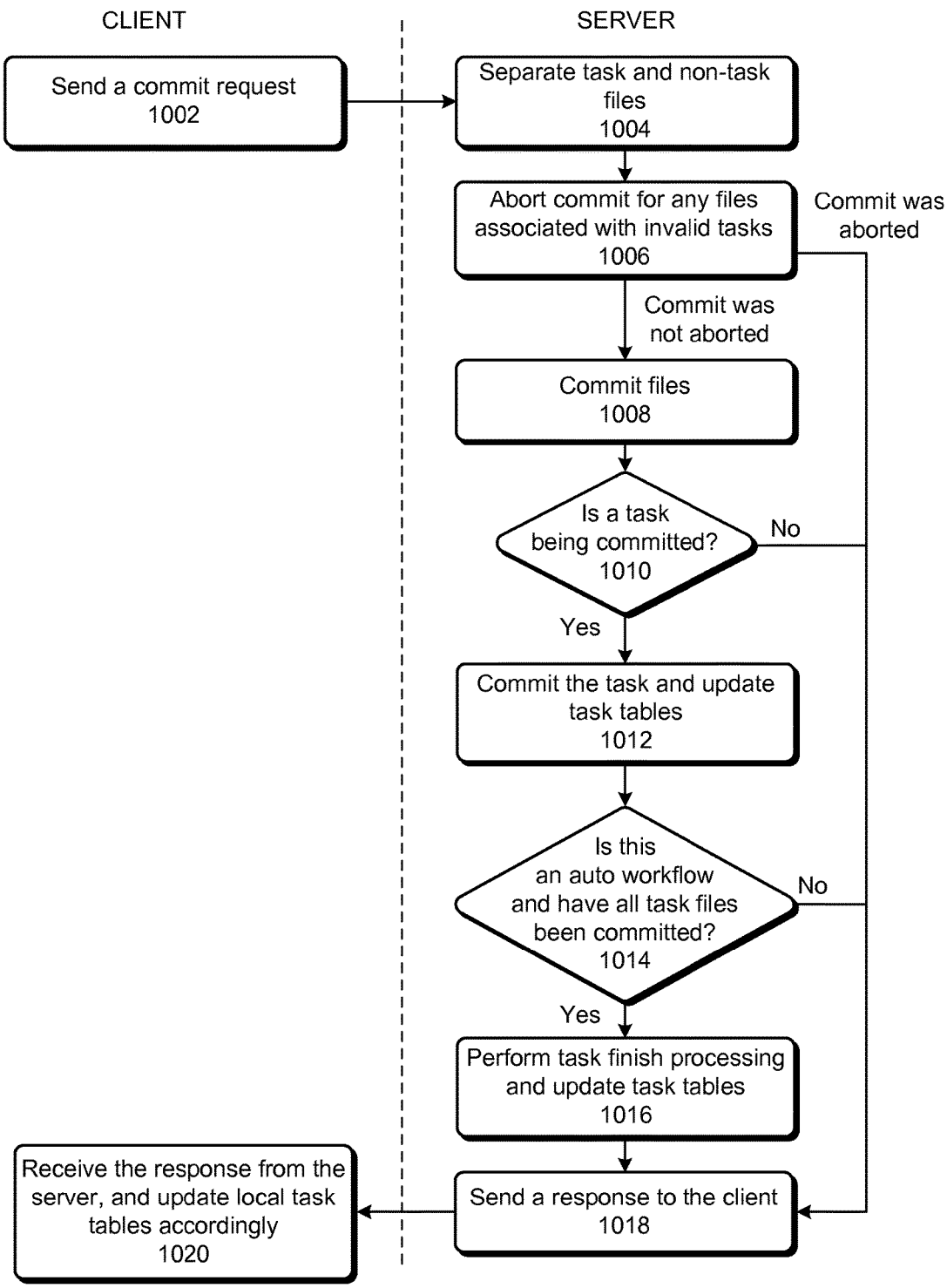
FIG. 10 presents a flowchart that illustrates a task commit flow in accordance with some embodiments described in this disclosure.

FIG. 10 presents a flowchart that illustrates a task commit flow in accordance with some embodiments described in this disclosure.

The process can begin by a client sending a commit request to a server (operation 1002). Upon receiving the request, the server can separate task and non-task files (operation 1004). If any of the task files are associated with invalid tasks, the server can abort the commit for those files (operation 1006). If the commit was aborted, the system can send an appropriate response to the client (operation 1018). On the other hand, if the commit was not aborted, the server can proceed with committing the files (operation 1008). The server can then check whether or not one or more tasks are being committed (operation 1010). If no tasks are being committed, then the commit flow is complete, and the server can send a response to the client (operation 1018). On the other hand, if one or more tasks are being committed, then the server can commit the tasks and update task tables accordingly (operation 1012). For example, the server may update the WorkTracker table at this point. Next, the server can check if this is an auto workflow and if all task files have been committed (operation 1014). If not, the server can send an appropriate response to the client (operation 1016). On the other hand, if this is an auto workflow and if all task files have been committed, then the server can perform task finish processing and update task tables accordingly (operation 1016). For example, at this point, the server may update the WorkProgressTable to indicate that the task has been finished. Next, the server can send an appropriate response to the client (operation 1018). Upon receiving the response, the client can update the local task tables accordingly (operation 1020). For example, depending on the response from the server, the client can clean the Fuid2WorkId table.

In some embodiments, when an assigned task is declared as being finished by the task commit flow or the sign-off flow, the assigned task can enter the review mode if a review task follows it in the workflow. The reviewers are automatically notified (e.g., by email and/or via a system tray icon). All the files from the previous assigned tasks are displayed to the reviewer when the reviewer signs-in. The system can store all the comments in the WorkProgress table, so that the reviewer can check any annotations made by the assignee (i.e., the person who was responsible for completing the task). During review, any comments or annotations made by the approver are also stored on the server in the WorkProgress table. If the task is rejected, the assignee can view comments from each approver. During review, the locks are not removed. Therefore, the files being reviewed can't be modified.

Note that, due to the tight integration between the VCS and the workflow system, if a task is rejected and work is re-submitted, the approver will automatically have the latest version available for review. The tight integration between VCS and workflow makes it relatively easy to track the versions being reviewed. Based on the review policy (all, any, majority, etc.), the system can check the work progress table to see if a quorum of reviewers have submitted their reviews. As soon as a quorum is reached, task status (e.g., rejected or approved) can be determined, and appropriate action can be taken.

In some embodiments, instead of maintaining a list of sequential tasks in each workflow, the system can maintain a graph of tasks in each workflow. This can be done easily by storing with each task a list of its parent tasks. In this way the system can achieve a combination of sequential and parallel tasks in a workflow. The precondition for starting a task can then be modified to checking whether or not all the parent tasks have completed.

Milestone Publishing

In a typical scenario of version control use in an organization, hundreds of asset creation and modification commits may happen each day, where, a single commit may include multiple files—newly added and/or modified. Each commit contributes to a revision in the repository. Thus, it can be very difficult to know which files at which revision are stable.

In order to overcome this problem, some embodiments described herein provide methods and systems for publishing milestones in a project which consistently maintains the namespace uniqueness invariant, even as assets have different published revisions including namespace modifications. Milestones can be published manually or automated through the workflow management system, thus eliminating human error. Internally, an asset revision is published by tagging the asset at the particular revision and branch as "published". The tag, the asset FUID, Branch BID and the repository revision number (RRN) are stored in the Tag Table.

Every time a publishing transaction takes place, the server checks to ensure that the namespace uniqueness invariant is not violated for the published asset versions. This ensures that a user can checkout the published version of an entire project. If this invariant is violated, then the transaction is aborted and the user must resolve the violation before retrying. In order to minimize the chances of such a violation occurring, some embodiments place the following constraint: once an asset has been published for a branch, only a higher revision of the same can be published again. This is to say that "Published" tags are constrained to have monotonically increasing asset revision numbers. However, if in the place of a lower revision of an asset, a higher revision was published by mistake, there is the option of promoting the former to become the "latest" revision and then publishing it.

In the auto publishing feature, all the assets associated with a task which have been reviewed and approved are marked as published (tagged as Published) by the workflow manager. In this way, we can always distinguish and use only published files which we can be sure are approved revisions out of the thousands of files and revisions.

In some embodiments, milestone publishing may be implemented by storing publishing information independently and not as a general "publish" tag in the TagTable. This may be useful when storing asset publishing history, while not storing asset tagging history. For instance, the history of baseline publishing an entire project is stored in the ProjectPublishInfo database.

Integrated Thumbnail Versioning

In some embodiments, the versioning of thumbnails happens automatically while normal VCS operations are being performed on the digital files. Specifically, in some embodiments, versioning of thumbnails occurs automatically whenever any one of the four basic VCS operations is performed on certain types of digital assets. Generating thumbnails for the four basic VCS operations are described below.

Import or Add: if the MIME type of the file being added suggests that thumbnail needs to be maintained, then the server/client itself creates a thumbnail for the file. The server identifies every file with a unique identifier, called FUID. In some embodiments, once a thumbnail is created, a mapping from the file's FUID to the thumbnail's FUID is stored in a database table referred to as the Thumb_Fuid_Table. This table is the single point of reference for finding thumbnail files on the server. At the time of an import or add, like all other digital assets, the thumbnail data is stored on the server as a full base file.

Checkout: when the client checks-out or retrieves a group of files from the server, it also receives the Thumb_Fuid_Table entries from the server, corresponding to them. Actual thumbnail file data is not sent by the server until the user requires it.

Commit: when a client wants to submit any changes in the digital assets to the server, then the Thumb_Fuid_Table, received at the time of checkout is consulted to see whether a thumbnail also needs to be submitted. If so, the thumbnail is created by the client and stored on the client side. Next, a delta (i.e., a difference between the new version of the thumbnail and the old version of the thumbnail is sent from the thumbnail of the previous version of the file) is generated and sent to the server. In case the previous version's thumbnail is not present on the client, then the client can request the thumbnail from the server before computing the delta. The server appends this delta in the thumbnail's file and makes an offset and length entry corresponding to the version committed in its file index table exactly as it does for any other digital asset.

Update: while receiving modifications from the server, if there are any new files being sent to the client, then the Thumb_Fuid_Table entries corresponding to them are also sent by the server. Note that, in some embodiments, the actual thumbnail file data is not sent by server.

In this way, some embodiments can automatically manage thumbnails in VCS. The thumbnail data is stored just like other digital assets in the form of deltas to the previous revision, starting from a full base revision, thereby saving valuable disk space. Further, transporting deltas on the network ensures that the thumbnails have a minimal impact on the network.

The client requests the thumbnail deltas only when needed, and so there is no extra load during checkouts and updates. At the client, the deltas for thumbnails are further cached to ensure that once the deltas have been received, they are reused directly without requiring any remote calls to be invoked.

Client maintains a cache of the thumbnails inside the VCS directory. This cache is maintained on a per repository/server basis. With a per server scheme we ensure that even if the client has multiple checked-out working copies from the same server, they all use the same single thumbnail cache.

Specifically, in some embodiments, the thumbnail cache on the client for a particular server can contain the following tables.

Thumb_Fuid_Table: as mentioned above, the Thumb_Fuid_Table stores the mapping from a file's FUID to its thumbnail's FUID. Entries are made in the client-side table during checkout and updates. While submitting changes to the server, if the client finds an entry for the file being submitted in this table, then the delta is sent for the thumbnail also.

Thumbnail File data: every thumbnail has its own data file, which contains the data organized as deltas to the previous revision, starting from a full base revision, appended one after the other. Whenever a thumbnail for a particular version is required, the corresponding deltas are combined with the base to obtain the actual thumbnail. In this way, the cache stores the data in a compact form and we can thus cache file data for a large number of versions of many files simultaneously, at a small disk cost on the client.

Thumb_File_Index_Table: this table contains information about the starting offset in the thumbnail data file and length of the delta for each version of a thumbnail. The client refers to this table to verify whether it has the delta for a particular version of a thumbnail or does it need to get it from server. Also while combining the deltas to obtain thumbnail, it helps as a pointer into the data file locating the data for each delta.

Actual thumbnails: the actual thumbnails once obtained from deltas are also stored inside the cache. For further requests they are directly used. Also they help in quicker computation of thumbnails for later versions. For example, suppose we have deltas for ten versions and we have already combined deltas to obtain the thumbnail of fifth version during some earlier operation. Now if we want to obtain the thumbnail of seventh version, then instead of combining seven deltas we can directly apply deltas for sixth and seventh version on the fifth version's thumbnail, thus saving us valuable processing and disk I/O time.

With the help of this cache, when a user is exploring a visual list of files, the user need not wait for thumbnails to come from server, thus helping the user quickly browse through previews of a large number of different versions of different digital files.

The disk space on the cache can be freed by removing the actual thumbnails as they can always be regenerated through the deltas present on the client. In case the user wants to reduce disk usage even further, then the delta files along with Thumb_File_Index_Table entries can also be deleted. Only Thumb_Fuid_Table needs to be present which stores a mapping from an asset to its thumbnail and thus requires very little storage space.

Figure 11:
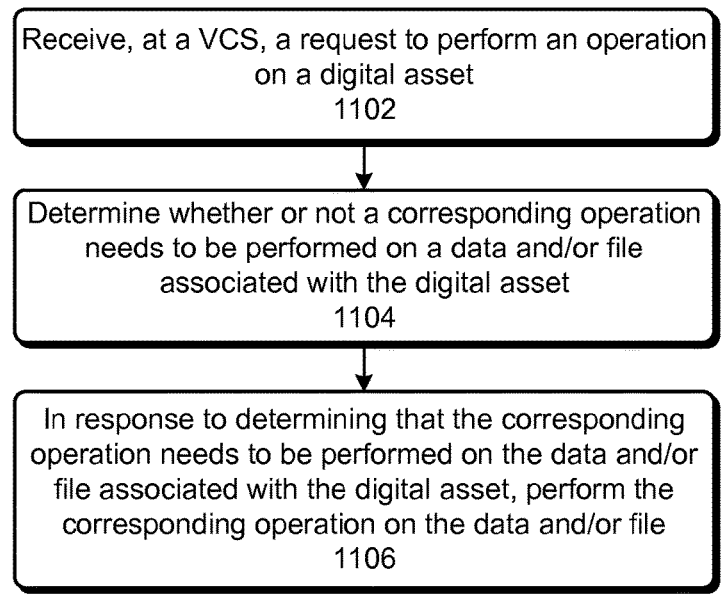
FIG. 11 presents a flowchart that illustrates how data and/or files associated with digital assets can be automatically maintained in a version control system in accordance with some embodiments described in this disclosure.

FIG. 11 presents a flowchart that illustrates how data and/or files associated with digital assets can be automatically maintained in a version control system in accordance with some embodiments described in this disclosure.

The process can begin by a VCS receiving a request to perform an operation on a digital asset (operation 1102). The VCS can then determine whether or not a corresponding operation needs to be performed on a data and/or file associated with a digital asset (operation 1104). For example, in some embodiments, the data and/or file associated with the digital asset can be a thumbnail. If the requested operation is for importing or adding a digital asset, the VCS can determine whether or not any metadata (e.g., the MIME type) associated with the digital asset indicates that a data and/or file (e.g., a thumbnail) should also be imported or added into the VCS. For other operations, the VCS can determine whether or not the digital asset is associated with other data and/or files (e.g., a thumbnail). For example, the VCS can look-up a table that stores a mapping between digital assets and their thumbnails (e.g., the Thumb_Fuid_Table table). If the VCS determines that associated data and/or files (e.g., a thumbnail) exists for the digital asset, the VCS can conclude that a corresponding operation needs to be performed on the associated data and/or file (e.g., the thumbnail).

Next, in response to determining that the corresponding operation needs to be performed on the data and/or file (e.g., the thumbnail) associated with the digital asset, the VCS can perform the corresponding operation on the data and/or file (e.g., the thumbnail) (operation 1106).

Figure 12:
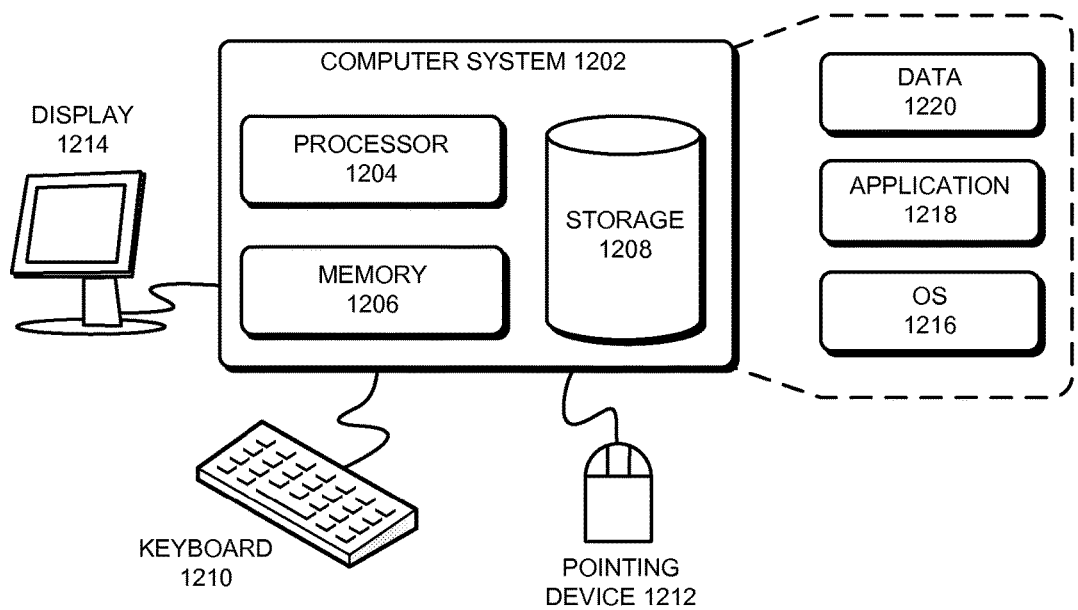
FIG. 12 illustrates a computer system in accordance with some embodiments described in this disclosure.

FIG. 12 illustrates a computer system in accordance with some embodiments described in this disclosure.

A computer system can generally include any device or any collection of devices that is capable of performing computations. Specifically, a computer system, such as computer system 1202, can include processor 1204, memory 1206, and storage device 1208. Computer system 1202 can be coupled to display device 1214, keyboard 1210, and pointing device 1212. Storage device 1208 can store operating system 1216, application 1218, and data 1220. Data 1220 can include files, repositories, databases, tables, etc. Application 1218 can include digital asset management software.

Computer system 1202 may perform (automatically or based on user input) any method that is implicitly or explicitly described in this disclosure. Specifically, during operation, computer system 1202 can load application 1218 into memory 1206. Application 1218 can then enable a user to manage digital assets.

The data structures and code described in this disclosure can be partially or fully stored on a non-transitory computer-readable storage medium and/or a hardware mechanism and/or a hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other non-transitory media, now known or later developed, that are capable of storing code and/or data. The methods and processes described in this disclosure can be partially or fully embodied as code and/or data stored in a computer-readable storage medium or device, so that when one or more computer systems read and/or execute the code and/or data, the associated methods and processes are performed.

The foregoing descriptions of embodiments of the present invention have been presented only for purposes of illustration and description. They are not intended to be exhaustive or to limit the present invention to the forms disclosed. Accordingly, many modifications and variations will be apparent to practitioners having ordinary skill in the art. Additionally, the above disclosure is not intended to limit the present invention. The scope of the present invention is defined by the appended claims.

What is claimed is:

1. A method for namespace versioning, comprising:
receiving a change in a name or a namespace of a digital asset in an existing namespace version, wherein the existing namespace version includes an existing set of identifiers corresponding to the digital asset, wherein the existing set of identifiers includes a first identifier whose value uniquely identifies the digital asset, a second identifier whose value specifies a name of the digital asset, a third identifier whose value identifies a branch, and a fourth identifier whose value identifies a parent;
creating, by a computer, a new namespace version that includes a new set of identifiers corresponding to the digital asset, wherein at least one identifier in the new set of identifiers has a different value than a corresponding identifier in the existing set of identifiers, and wherein the new set of identifiers is associated with a path status variable that indicates a type of the change in the name or the namespace that was made to the digital asset;
detecting that a merge is being performed between two or more namespaces;
generating a dependency graph based on the two or more namespaces;
breaking a cycle in the dependency graph by creating a temporary change state for a node in the cycle;
identifying disjoint connected components in the dependency graph;
concurrently merging the namespace portions associated with each disjoint connected component by processing nodes in dependency chains in the dependency graph in reverse order; and
restoring the temporary state of the node to a target state.

2. The method of claim 1, further comprising detecting a conflict during said concurrently merging the namespaces.

3. The method of claim 2, wherein the conflict is one of:
a data conflict, which occurs when target states for an asset in a working copy and in a repository copy both contain file data modifications;
a name conflict, which occurs when target states for the asset in the working copy and in the repository copy both contain name or namespace changes; or
a dependency conflict, which occurs when an asset's changes depend on another asset's changes for which a conflict has been detected.

4. The method of claim 3, further comprising prompting a user with a set of options to resolve the conflict.

5. The method of claim 3, further comprising resolving the conflict based on a set of rules.

6. The method of claim 5, wherein said resolving the conflict based on the set of rules comprises resolving data conflicts before resolving name and dependency conflicts.

7. A non-transitory computer-readable storage medium storing instructions that, when executed by a computer, cause the computer to perform a method for namespace versioning, the method comprising:
receiving a change in a name or a namespace of a digital asset in an existing namespace version, wherein the existing namespace version includes an existing set of identifiers corresponding to the digital asset, wherein the existing set of identifiers includes a first identifier whose value uniquely identifies the digital asset, a second identifier whose value specifies a name of the digital asset, a third identifier whose value identifies a branch, and a fourth identifier whose value identifies a parent;
creating a new namespace version that includes a new set of identifiers corresponding to the digital asset, wherein at least one identifier in the new set of identifiers has a different value than a corresponding identifier in the existing set of identifiers, and wherein the new set of identifiers is associated with a path status variable that indicates a type of the change in the name or the namespace that was made to the digital asset;
detecting that a merge is being performed between two or more namespaces;
generating a dependency graph based on the two or more namespaces;
breaking a cycle in the dependency graph by creating a temporary change state for a node in the cycle;
identifying disjoint connected components in the dependency graph;
concurrently merging the namespace portions associated with each disjoint connected component by processing nodes in dependency chains in the dependency graph in reverse order; and
restoring the temporary state of the node to a target state.

8. The non-transitory computer-readable storage medium of claim 7, wherein the method further comprises detecting a conflict during said concurrently merging the namespaces.

9. The non-transitory computer-readable storage medium of claim 8, wherein the conflict is one of:
a data conflict, which occurs when target states for an asset in a working copy and in a repository copy both contain file data modifications;
a name conflict, which occurs when target states for the asset in the working copy and in the repository copy both contain name or namespace changes; or
a dependency conflict, which occurs when an asset's changes depend on another asset's changes for which a conflict has been detected.

10. The non-transitory computer-readable storage medium of claim 9, wherein the method further comprises prompting a user with a set of options to resolve the conflict.

11. The non-transitory computer-readable storage medium of claim 9, wherein the method further comprises resolving the conflict based on a set of rules.

12. The non-transitory computer-readable storage medium of claim 11, wherein said resolving the conflict based on the set of rules comprises resolving data conflicts before resolving name and dependency conflicts.

13. An apparatus, comprising:
a processor; and
a non-transitory computer-readable storage medium storing instructions that, when executed by the processor, cause the apparatus to perform a method for namespace versioning, the method comprising:
receiving a change in a name or a namespace of a digital asset in an existing namespace version, wherein the existing namespace version includes an existing set of identifiers corresponding to the digital asset, wherein the existing set of identifiers includes a first identifier whose value uniquely identifies the digital asset, a second identifier whose value specifies a name of the digital asset, a third identifier whose value identifies a branch, and a fourth identifier whose value identifies a parent; and creating a new namespace version that includes a new set of identifiers corresponding to the digital asset, wherein at least one identifier in the new set of identifiers has a different value than a corresponding identifier in the existing set of identifiers, and wherein the new set of identifiers is associated with a path status variable that indicates a type of the change in the name or the namespace that was made to the digital asset;

detecting that a merge is being performed between two or more namespaces;

generating a dependency graph based on the two or more namespaces;

breaking a cycle in the dependency graph by creating a temporary change state for a node in the cycle;

identifying disjoint connected components in the dependency graph;

concurrently merging the namespace portions associated with each disjoint connected component by processing nodes in dependency chains in the dependency graph in reverse order; and restoring the temporary state of the node to a target state.

14. The apparatus of claim 13, wherein the method further comprises detecting a conflict during said concurrently merging the namespaces.

15. The apparatus of claim 14, wherein the conflict is one of:
a data conflict, which occurs when target states for an asset in a working copy and in a repository copy both contain file data modifications;
a name conflict, which occurs when target states for the asset in the working copy and in the repository copy both contain name or namespace changes; or
a dependency conflict, which occurs when an asset's changes depend on another asset's changes for which a conflict has been detected.

16. The apparatus of claim 15, wherein the method further comprises prompting a user with a set of options to resolve the conflict.

17. The apparatus of claim 15, wherein the method further comprises resolving the conflict based on a set of rules.

18. The method of claim 15, wherein said resolving the conflict based on the set of rules comprises resolving data conflicts before resolving name and dependency conflicts.

* * * * *